US008023786B2

(12) United States Patent
Lapp

(10) Patent No.: US 8,023,786 B2
(45) Date of Patent: Sep. 20, 2011

(54) CABLE

(75) Inventor: Siegbert Lapp, Stuttgart (DE)

(73) Assignee: Lapp Engineering & Co., Cham (CH)

( * ) Notice: Subject to any disclaimer, the term of this patent is extended or adjusted under 35 U.S.C. 154(b) by 0 days.

(21) Appl. No.: 12/590,446

(22) Filed: Nov. 6, 2009

(65) Prior Publication Data

US 2010/0142902 A1 Jun. 10, 2010

Related U.S. Application Data

(63) Continuation of application No. PCT/EP2008/055229, filed on Apr. 29, 2008.

(30) Foreign Application Priority Data

May 8, 2007 (DE) ......................... 10 2007 022 325

(51) Int. Cl.

| | |
|---|---|
| ***G02B 6/44*** | (2006.01) |
| ***H02G 3/00*** | (2006.01) |
| ***H01R 33/945*** | (2006.01) |
| ***H01Q 1/50*** | (2006.01) |

(52) U.S. Cl. ........ 385/101; 385/100; 385/102; 385/103; 385/104; 385/105; 385/106; 385/107; 385/108; 385/109; 385/110; 385/111; 385/112; 385/113; 385/114; 174/70 R; 439/577; 343/905; 343/719; 343/872; 343/873; 343/884

(58) Field of Classification Search .......... 385/100–114; 439/577; 174/70 R; 343/905, 719, 872–873, 343/884

See application file for complete search history.

(56) References Cited

U.S. PATENT DOCUMENTS

| | | | | |
|---|---|---|---|---|
| 4,751,614 A | | 6/1988 | Mehnert | |
| 4,880,484 A | | 11/1989 | Obermeirer et al. | |
| 5,045,368 A | | 9/1991 | Cosman et al. | |
| 5,106,175 A | * | 4/1992 | Davis et al. | 385/100 |
| 5,305,410 A | * | 4/1994 | Arroyo | 385/109 |

(Continued)

FOREIGN PATENT DOCUMENTS

CA 2 581 186 5/2006

(Continued)

*Primary Examiner* — Brian M. Healy
*Assistant Examiner* — Guy Anderson
(74) *Attorney, Agent, or Firm* — Lipsitz & McAllister, LLC

(57) ABSTRACT

In order to improve a cable, comprising an inner cable body, in which at least one conductor strand of an optical and/or electrical conductor runs in the longitudinal direction of the cable, an outer cable sheath, enclosing the inner cable body and lying between an outer sheath surface of the cable and the inner cable body, and at least one information carrier unit, disposed within the outer sheath surface of the cable such that the cable also comprises a shielding, the invention proposes that the information carrier unit having an antenna unit lying in an antenna surface running approximately parallel to the longitudinal direction of the cable, by the antenna surface running at a distance from an electrical shielding of the cable and by providing, between the antenna surface and the shielding, a spacing layer, in which the electromagnetic field that couples to the antenna unit and passes through the antenna surface can extend between the antenna unit and the shielding.

24 Claims, 18 Drawing Sheets

U.S. PATENT DOCUMENTS

| | | | | | |
|---|---|---|---|---|---|
| 5,532,598 | A | | 7/1996 | Clark, Jr. et al. | |
| 5,541,803 | A | | 7/1996 | Pope, Jr. et al. | |
| 5,577,147 | A | * | 11/1996 | Arroyo et al. | 385/109 |
| 5,578,926 | A | | 11/1996 | Reinhardt | |
| 5,729,966 | A | | 3/1998 | Grulick | |
| 5,808,779 | A | | 9/1998 | Weis | |
| 5,902,251 | A | * | 5/1999 | vanHooydonk | 600/549 |
| 5,986,207 | A | | 11/1999 | Uhlenhuth | |
| 6,563,094 | B2 | * | 5/2003 | Kochman et al. | 219/549 |
| 6,791,454 | B2 | | 9/2004 | Mangold et al. | |
| 6,973,243 | B2 | * | 12/2005 | Koyasu et al. | 385/100 |
| 7,041,906 | B2 | | 5/2006 | John | |
| 7,201,221 | B2 | | 4/2007 | Tubel et al. | |
| 7,223,962 | B2 | | 5/2007 | Fageraas et al. | |
| 7,313,304 | B2 | * | 12/2007 | Andrews et al. | 385/107 |
| 7,539,379 | B2 | * | 5/2009 | Khoshaba et al. | 385/100 |
| 2002/0034365 | A1 | | 3/2002 | Vogelsang | |
| 2002/0061727 | A1 | | 5/2002 | Mangold et al. | |
| 2004/0149488 | A1 | | 8/2004 | John | |
| 2004/0156601 | A1 | | 8/2004 | Koyasu et al. | |
| 2004/0184747 | A1 | | 9/2004 | Koyasu et al. | |
| 2005/0083203 | A1 | | 4/2005 | Surkau | |
| 2005/0129088 | A1 | | 6/2005 | Rajendran et al. | |
| 2005/0140512 | A1 | | 6/2005 | Sakama et al. | |
| 2006/0214801 | A1 | | 9/2006 | Murofushi et al. | |

FOREIGN PATENT DOCUMENTS

| | | |
|---|---|---|
| DE | 17 65 765 | 8/1971 |
| DE | 36 20 595 | 2/1987 |
| DE | 37 43 470 | 3/1989 |
| DE | 43 33 121 | 5/1994 |
| DE | 690 09 113 | 11/1994 |
| DE | 690 14 521 | 6/1995 |
| DE | 690 16 035 | 6/1995 |
| DE | 196 01 651 | 7/1997 |
| DE | 196 39 902 | 12/1997 |
| DE | 197 02 536 | 7/1998 |
| DE | 198 14 540 | 10/1999 |
| DE | 299 21 017 | 5/2000 |
| DE | 695 16 138 | 12/2000 |
| DE | 199 55 120 | 5/2001 |
| DE | 101 11 371 | 9/2002 |
| DE | 20 2004 017 158 | 2/2005 |
| DE | 10 2004 051 594 | 5/2006 |
| DE | 10 2005 006 318 | 8/2006 |
| DE | 10 2005 044 482 | 4/2007 |
| DE | 10 2005 058 385 | 6/2007 |
| DE | 10 2006 036 719 | 2/2008 |
| EP | 0 408 320 | 1/1991 |
| EP | 0 419 637 | 4/1991 |
| EP | 1 191 354 | 3/2002 |
| EP | 1 220 236 | 7/2002 |
| EP | 1 424 882 | 6/2004 |
| EP | 1 548 639 | 6/2005 |
| EP | 1 772 657 | 4/2007 |
| EP | 1 884 811 | 2/2008 |
| FR | 2 830 941 | 4/2003 |
| JP | 2003203527 | 7/2003 |
| WO | 90/10879 | 9/1990 |
| WO | 91/04503 | 4/1991 |
| WO | 95/32439 | 11/1995 |
| WO | 03/067512 | 8/2003 |
| WO | 03/091665 | 11/2003 |
| WO | 2004/072988 | 8/2004 |

* cited by examiner

CABLE

This application is a continuation of International application No. PCT/EP2008/055229 filed on Apr. 29, 2008.

This patent application claims the benefit of International application No. PCT/EP2008/055229 of Apr. 29, 2008 and German application No. 10 2007 022 325.2 of May 8, 2007, the teachings and disclosure of which are hereby incorporated in their entirety by reference thereto.

BACKGROUND OF THE INVENTION

The invention relates to a cable, comprising an inner cable body, in which at least one conductor strand of an optical and/or electrical conductor runs in the longitudinal direction of the cable, an outer cable sheath, enclosing the inner cable body and lying between an outer sheath surface of the cable and the inner cable body, and at least one information carrier unit, disposed within the outer sheath surface of the cable.

Such cables are known from the prior art. In the case of these known solutions, however, the inner cable body is not shielded by a shielding in the cable.

It is therefore an object of the invention to improve a cable of the type described at the beginning in such a way that it also has a shielding.

SUMMARY OF THE INVENTION

This object is achieved according to the invention in the case of a cable of the type described at the beginning by the information carrier unit having an antenna unit lying in an antenna surface running approximately parallel to the longitudinal direction of the cable, by the antenna surface running at a distance from an electrical shielding of the cable and by providing, between the antenna surface and the shielding, a spacing layer, in which the electromagnetic field that couples to the antenna unit and passes through the antenna surface can extend between the antenna unit and the shielding.

The advantage of the solution according to the invention can be seen in that, by the spacing layer provided, it created the possibility of also achieving, when a shielding is present, a coupling of the antenna unit to the antenna unit of a read/write device.

In order to improve the formation of the electromagnetic field between the antenna unit and the shield, it is preferably provided that the spacing layer is formed in an electrically nonconducting manner.

It is particularly advantageous in this respect if the spacing layer is formed such that it does not influence the electromagnetic field that couples to the antenna unit.

It is preferably provided in this respect that the antenna unit is disposed at a distance of at least 1.5 mm from the shielding.

It is still better if the antenna unit is disposed at a distance of at least 2 mm from the screen.

As an alternative to the solution that the spacing layer is formed such that it does not influence the electromagnetic field that couples to the antenna unit, another solution provides that the spacing layer is formed at least partially such that it concentrates the magnetic field that couples to the antenna unit. Such a form of the spacing layer has the advantage that, by the concentration of the electromagnetic field, it opens up the possibility of achieving a good coupling between the antenna unit of the information carrier unit and the antenna unit of a read/write device even when there are small distances between the antenna unit and the shielding, since the field concentration has the effect that the electromagnetic field does not reach the shielding, and consequently no eddy currents weakening the electromagnetic field can be induced in said shielding.

It is particularly advantageous in this respect if a magnetic-field-concentrating layer is disposed in the spacing layer.

Such a magnetic-field-concentrating layer usually has a thickness of less than approximately 2 mm, and can consequently be provided without appreciably influencing the geometry of the cable.

Such a magnetic-field-concentrating layer can be produced particularly advantageously if it comprises magnetically conductive particles.

Such magnetically conductive particles are, for example, particles of ferrite, in particular magnetite, or of metal alloys.

Such magnetically conductive particles preferably have a particle size in the range from approximately 1 μm to approximately 50 μm, preferably in the range between approximately 2 μm and approximately 20 μm.

Furthermore, the magnetically conductive particles are suitably formed in an electrically nonconducting manner, so that they do not change the insulating properties in the cable, as is the case with ferrite.

The magnetically conductive particles can be disposed in the layer in a very wide variety of ways. For example, the magnetically conductive particles could be disposed on the surface of the shielding.

A particularly advantageous and lastingly viable solution provides that the magnetically conductive particles are embedded in an embedding material.

In particular in the case of electrically conductive particles, the embedding material suitably has the effect that the magnetically conductive particles are electrically insulated from one another, in order to avoid eddy current effects. This can be achieved in the simplest case by an embedding material which is itself electrically nonconducting.

In particular in order not to impair the mechanical properties of the cable, such an embedding material is a plastics material.

It is preferably provided in this respect that the plastics material is either a thermosetting or thermoplastic material, or for example PVC.

No further details have been specified so far with respect to the way in which the magnetic-field-concentrating layer is aligned and disposed.

It is particularly advantageous if the side of the magnetic-field-concentrating layer that faces away from the antenna unit, faces the shielding.

In this case, the magnetic-field-concentrating layer preferably runs over the entire extent of the antenna unit between the latter and the shielding.

With regard to the thickness of the magnetic-field-concentrating layer, no further details have been specified so far. An advantageous solution provides that the magnetic-field-concentrating layer has a thickness from approximately 50 μm to approximately 2 mm.

In order to obtain the same advantageous effects of the magnetic-field-concentrating layer in the entire region of the antenna unit, it is preferably provided that the magnetic-field-concentrating layer extends in an area of extent running approximately parallel to the antenna surface.

In principle, the magnetic-field-concentrating layer could in this case have a smaller extent than the antenna unit in the antenna surface. It is particularly advantageous, however, if the magnetic-field-concentrating layer has, in the area of extent, an extent which corresponds at least to an extent of the antenna unit in the antenna surface.

It is still better if the magnetic-field-concentrating layer has, in the area of extent, an extent which goes beyond the extent of the antenna unit in the antenna surface.

It is particularly advantageous for the formation of the magnetic field if a projection of the antenna unit lying in the antenna surface onto the area of extent of the magnetic-field-concentrating layer is disposed such that it is approximately centered in relation to the extent of this layer in the area of extent, so that the magnetic-field-concentrating layer acts in the same way substantially in opposite directions in each case with regard to its effect in relation to the antenna unit.

With regard to the extent of the antenna surface, no further details have been specified so far. It would, for example, be conceivable for the antenna surface to run in a substantially planar manner, if it does not have a particularly great extent transversely to the longitudinal direction of the cable.

It is more advantageous, however, if the antenna surface is adapted to the cable geometry and runs in an approximately cylindrical manner with respect to a center axis of the cable.

Purely in principle, it would also be conceivable for the area of extent for the magnetic-field-concentrating layer to run in a substantially planar manner. It is still more advantageous if the area of extent for the magnetic-field-concentrating layer also runs in a curved manner.

It is still more advantageous in this respect if the area of extent runs in an approximately cylindrical manner with respect to a center axis of the cable.

In order to improve further the effect of the magnetic-field-concentrating layer on the antenna unit, it is preferably provided that an intermediate layer is disposed between the magnetic-field-concentrating layer and the antenna unit.

This intermediate layer is preferably formed from a magnetically inert material.

With regard to the way in which the antenna unit is formed or the way in which it is realized, no further details have been specified so far.

For example, the antenna unit could be formed in a self-supporting manner.

A particularly advantageous solution, however, provides that the antenna unit is disposed on a base.

In order also not to obtain any impairment of the coupling by way of the magnetic field from the base, it is preferably provided that the base is produced from a magnetically inert material.

For example, the base could be formed such that it forms the intermediate layer.

In order also to be easily able to introduce the antenna into the cable and position it in a defined manner, it is preferably provided that the antenna is disposed on a carrier strand.

Furthermore, it is likewise preferably provided that the magnetic-field-concentrating layer is disposed on the carrier strand, so that it is consequently easily possible to position both the antenna unit and the magnetic-field-concentrating layer in relation to each other.

In order in the case of a carrier strand to obtain as little disturbance as possible of the mechanical properties of the cable, it is preferably provided that the magnetic-field-concentrating layer is disposed on a side of the carrier strand that faces the antenna unit, so that both the antenna unit and the magnetic-field-concentrating layer lie on the same side of the carrier strand.

With regard to the extent of the carrier strand, no further details in this respect have been specified in the matter discussed so far.

An advantageous solution thus provides that the carrier strand runs approximately parallel to a longitudinal direction of the shielding.

In this case, it is conceivable, for example, for the carrier strand to be formed as a filler tape, which is formed such that it encloses the shielding in the circumferential direction.

Another advantageous solution provides that the carrier strand runs such that it wraps around the shielding.

The carrier strand is preferably formed in this case such that it winds around the shielding.

In this case, a further separating layer could also lie between the carrier strand and the shielding. It is particularly advantageous, however, if the carrier strand lies directly on the shielding.

In the case of one embodiment, the carrier strand is formed in such a way that it merely serves the purpose of holding the information carrier unit and positioning it in the cable.

The carrier strand may, however, also have further functions. For example, the carrier strand is formed at least as part of a separating layer between the shielding and the cable sheath.

As an alternative to this, however, it is also conceivable for the carrier strand to lie on a separating layer between the shielding and the outer sheath of the cable.

A further advantageous solution provides that the antenna unit of the information carrier unit is disposed on a side of the carrier strand that faces away from the shielding, so that as a result no impairment of the mechanical properties of the cable can occur, in particular the relative movement between the shielding and the part of the cable surrounding said shielding.

Another solution which does not impair the mechanical properties of the cable provides that the antenna unit is embedded in the carrier strand.

A further advantageous solution provides that the spacing layer is at least partly formed by an intermediate sheath lying between the shielding and the outer sheath of the cable.

This intermediate sheath creates many advantageous possibilities with regard to the structure of a cable according to the invention.

For example, such an intermediate sheath creates the possibility of compensating for the surface undulations, in particular variations in radius, which are caused by the twisting of the conductor strands and by the form of the surface deviating from a substantially cylindrical form and are also manifested on structures lying on the inner cable body, and of consequently creating advantageous preconditions for supporting or accommodating the information carrier unit as uniformly as possible and substantially compensating for the surface undulations.

In the case of an advantageous embodiment, it is provided that the intermediate sheath between the information carrier unit and the shielding around the inner cable body has a material layer compensating for surface undulations of the inner cable body.

There is consequently the possibility of integrating information carrier units, in particular those that are locally pressure-sensitive, into the cable, since the material layer substantially prevents compressive forces which are locally unequal due to the surface undulations from acting on the information carrier unit, in particular during bending of the cable.

Furthermore, it is provided in the case of an advantageous embodiment that the intermediate sheath forms a surface which is substantially free from surface undulations of the inner cable body, so that a supporting surface that avoids mechanical loading is available for the information carrier unit.

It is of advantage in this respect if the intermediate sheath has a substantially smooth, ideally even substantially cylindrical, surface for the information carrier unit.

In addition, such an intermediate sheath provides the advantage of easily forming the spacing layer between the screen and the antenna surface with the greatest possible thickness.

Furthermore, such an intermediate sheath can also be advantageously used in such a way that the intermediate sheath comprises the magnetic-field-concentrating layer.

Such a magnetic-field-concentrating layer could be produced, for example, by magnetically conductive particles distributed in the intermediate sheath.

Since this layer can generally be relatively thin, it is preferably provided that magnetically conductive particles are disposed on the intermediate sheath.

In order, however, to be able to make the magnetic-field-concentrating layer thin, it is preferably provided that magnetically conductive particles are disposed on a surface of the intermediate sheath.

In this case, the surface of the intermediate sheath may be that which faces the shield, or that which faces the outer sheath of the cable.

In particular, it is advantageous if magnetically conductive particles are embedded in the surface in the intermediate sheath.

Such magnetically conductive particles can be easily embedded in the surface in a still soft material of the intermediate sheath, for example, by dusting or powdering or sprinkling.

This can be achieved, for example, by the shielding being provided with the magnetically conductive particles and then the intermediate sheath extruded on top. As an alternative to this, it is provided that the magnetically conductive particles are applied to the extruded-on intermediate sheath.

With regard to the way in which the antenna unit is disposed, likewise no further details have been specified so far. An advantageous solution provides that the antenna unit is disposed on an intermediate sheath lying between the shielding and an outer sheath of the cable.

The antenna unit could be disposed in such a way by, for example, the antenna unit being fully integrated in the intermediate sheath.

However, a solution which can be easily realized provides that the antenna unit is disposed on a surface of the intermediate sheath. In this case, the antenna unit can be provided particularly easily on the intermediate sheath when the cable is being produced.

It is particularly easy in this respect if the antenna unit is disposed on the surface of the intermediate sheath.

In order to achieve good fixing of the antenna unit, it is provided in the case of an alternative embodiment that the antenna unit is at least partly embedded into the intermediate sheath.

Such partial embedding of the antenna unit in the intermediate sheath may likewise be performed by embedding a wire. For example, if the antenna unit is a simple loop.

However, it is also conceivable to realize embedding of a conductor track, formed by a conductive paste or a conductive lacquer.

It is still more advantageous, in particular for the protection of the antenna unit, if the latter is predominantly embedded in the intermediate sheath.

The protection is particularly good if the antenna unit is substantially embedded in the intermediate sheath.

As already mentioned, there are various advantageous embodiments of the antenna unit. An advantageous embodiment provides that the antenna unit is formed by an antenna wire.

Such an antenna wire may, for example, be laid as such onto the surface of the intermediate sheath and connected to the integrated circuit.

However, there is also the possibility of embedding the antenna wire partially or largely or completely in the intermediate sheath.

Another suitable embodiment of the antenna unit provides that it is formed as a conductor track on a base.

Such a formation of the antenna unit as a conductor track on a base has the advantage that the conductor track on the base can be produced in advance and then can be disposed together with the base on the intermediate sheath. In this case, the integrated circuit may likewise be disposed on the base.

There is also the possibility of disposing the integrated circuit on the intermediate sheath in advance and subsequently disposing the antenna unit with the base on the intermediate sheath.

A further advantageous possibility also envisages first disposing the antenna unit with the base on the intermediate sheath and then placing the intermediate circuit on it.

With regard to how the base is disposed in relation to the surface of the intermediate sheath, an advantageous solution provides that the base lies on the surface of the intermediate sheath.

This can be realized by the base being on the surface of the intermediate sheath.

It is alternatively conceivable for the base to be at least partly embedded in the intermediate sheath. It is still better if the base is predominantly embedded in the intermediate sheath and a particularly suitable solution for the protection of the base provides that the base is substantially embedded in the intermediate sheath.

Another advantageous embodiment of the antenna unit provides that the antenna unit is formed as a conductor track disposed directly on the intermediate sheath. Forming the conductor track in such a way makes it possible for the intermediate sheath itself to be used directly as a base.

In this case, the conductor track may, for example, be formed by a conductive material applied to the intermediate sheath.

The conductive material may in this case be disposed directly on the surface of the intermediate sheath, and consequently be merely on the surface of the same and be covered by the outer sheath.

Better fixing of the conductor track envisages that the conductor track is at least partially embedded in the intermediate sheath.

It is still better in this respect for the conductor track to be largely or substantially completely embedded in the intermediate sheath, since this makes it possible, in particular when an electrically conductive material is applied, to achieve better protection of the same and also better protection of the contacting between the same and the integrated circuit.

A particularly advantageous embodiment provides that the conductor track is applied to the intermediate sheath by a printing operation or impressing operation.

When explaining the information carrier unit itself, no further details have been specified so far. An advantageous solution provides that the information carrier unit comprises an integrated circuit.

This integrated circuit may also be initially disposed in principle at any location in the cable.

A particularly advantageous solution provides in this respect that the integrated circuit is combined with the antenna unit to form a subassembly.

In this case, it is likewise advantageous if the integrated circuit is disposed on the intermediate sheath.

It is still better if the integrated circuit is at least partly embedded in the intermediate sheath.

A particularly suitable solution provides that the integrated circuit is at least partly embedded in the outer sheath of the cable.

In the case of one embodiment of the information carrier unit, when the integrated circuit is placed onto the conductor tracks which form the antenna unit and are, for example, disposed on the intermediate sheath, contacting between connecting points of the integrated circuit and the conductor tracks takes place at the same time, for example by an electrically conductive adhesive. For this reason, the integrated circuit protrudes above the conductor tracks.

In the case of such an exemplary embodiment, it may therefore be of advantage if the integrated circuit stands above the surface of the intermediate sheath and is at least partly embedded in the outer sheath.

In the case of one embodiment, it is conceivable for the integrated circuit to be substantially embedded in the outer sheath.

With regard to the structure of the information carrier units, no further details have been specified so far.

An advantageous solution provides that the information carrier unit has at least one memory for the information that can be read out.

Such a memory could be formed in a very wide variety of ways. For example, the memory could be formed such that the information stored in it can be overwritten by the read/write device.

However, a particularly advantageous solution provides that the memory has a memory area in which items of information once written are stored such that they are write-protected.

Such a memory area is suitable, for example, for storing an identification code for the information carrier unit or other data specific to this information carrier unit, which can no longer be changed by any of the users.

Such a memory area is also suitable, however, for the cable manufacturer to store information which is not to be overwritten. Such information is, for example, cable data, cable specifications or else details of the type of cable and how it can be used.

However, these data may, for example, also be supplemented by data comprising details about the manufacture of the specific cable or data representing the test records from final testing of the cable.

In addition, a memory according to the invention may also be formed furthermore in such a way that it has a memory area in which items of information are stored such that they are write-protected by an access code.

Such write-protected storage of information may, for example, comprise data which can be stored by a user. For example, after preparation of the cable, a user could store in the memory area data concerning the preparation of the cable or concerning the overall length of the cable or concerning the respective portions over the length of the cable, the user being provided for this purpose with an access code by the cable manufacturer, in order to store these data in the memory area.

A further advantageous embodiment provides that the memory has a memory area to which information can be freely written.

Such a memory area may, for example, receive information which is to be stored by the cable user in the cable, for example concerning the type of installation or the preparation of the same.

In particular when a number of information carrier units are used, it would be conceivable, for example, for it to be possible for all the information carrier units to be addressed with one access code. However, this has the disadvantage that the information carrier units consequently cannot be selectively used, for example to assign different information to specific portions of the cable.

One conceivable solution for assigning different information to different portions of the cable would be that each of the information carrier units bears a different specified length, so that, by reading out the specified length of an information carrier unit, its distance from one of the ends of the cable or from both ends of the cable can be determined.

For this reason, it is advantageous if each of the information carrier units can be individually addressed by an access code.

In connection with the description so far of the information carrier units, it has just been assumed that they carry information which has been stored in the information carrier units by external read/write devices either before or during the production of the cable or during the use of the cable.

A further advantageous solution for a cable according to the invention provides that the at least one information carrier unit of the cable picks up at least one measured value of an associated sensor, that is to say that the information carrier unit not only stores and makes available external information but is itself capable of acquiring information about the cable, that is to say physical state variables of the cable.

The advantage of this solution can be seen in that it enables the information carrier unit not only to be used for making information available for reading out but also to be used for providing by means of the sensor, indications about the state of the cable, for example about physical state variables of the cable.

In particular, such sensing of state variables may take place during the operation of the cable or else independently of the operation of the cable.

Consequently, there is an optimum possibility of on the one hand sensing the state of the cable without in-depth investigation of the same and on the other hand of possibly checking the state of the cable, in particular to the extent that potential damage to the conductor strands when certain physical state variables occur can be detected.

In principle, any desired state variables can be picked up with such a sensor, that is to say in principle all state variables for which sensors that can be installed in cables exist.

A preferred solution provides in this respect that the sensor picks up at least one of the state variables that may lead to the cable becoming damaged—for example if they act for a long time or if certain values are exceeded—such as radiation, temperature, tension, pressure, elongation and moisture.

With regard to the way in which the sensor is disposed, no specific details have been given so far.

An advantageous solution provides that the sensor is mechanically connected to a base of the antenna unit.

With regard to the operation of the information carrier unit and the operation of the sensor on the part of the information carrier unit, no further details have been specified so far. An advantageous solution provides that the information carrier unit reads out the sensor in the activated state.

This means that the information carrier unit has no power supply of its own, but has to be activated by an external energy supply.

One possibility for such activation is that the information carrier unit can be activated by a read/write device.

Another advantageous solution provides that the information carrier unit can be activated by a magnetic field of a current flowing through the cable, the magnetic field passing through the shielding.

This solution has the advantage that no activation of the information carrier unit by the read/write device is required, but rather an alternating magnetic field which provides sufficient energy for the operation of the information carrier unit is available independently of the read/write device, the information carrier unit likewise picking up this energy by way of a suitable antenna.

The current flowing through the cable may, for example, be a current which is variable over time, as is used in the case of drives supplied with pulse-width-modulated current.

The current flowing through the cable may be a current flowing in a data line or a variable-frequency current, as is used in control lines for synchronous motors.

However, it is also conceivable for the current to be a conventional alternating current at a specific frequency, for example including the power-line frequency.

Furthermore, it would be possible for two lines of the cable to be connected in such a way that an electromagnetic field with the standardized carrier frequency of the information carrier units to be produced. This would have the advantage that no special measures have to be taken for supplying energy to the information carrier units.

In all these cases, the coupling-in of the energy takes place inductively by way of the alternating electromagnetic field, in particular of low frequency, produced by this alternating current and penetrating through the shielding, into the antenna unit of the information carrier unit.

In principle, it would be sufficient to form the information carrier unit in such a way that it picks up the measured value and then transmits it immediately to the read/write device.

In order, however, to be able to pick up different measured values at different points in time, for example including during the transmission of other kinds of information between the read/write device and the information carrier unit, it is preferably provided that the information carrier unit stores the at least one measured value in a memory. In this way, the measured value can be read out at any times desired, that is to say whenever it is requested by the read/write device.

In particular, there is also the possibility in this respect of then picking up measured values and making them accessible later when the information carrier unit is not interacting with a read/write device and is, for example, activated by an electromagnetic field of a current flowing through the cable.

Since cables can be expected to have long service lives and the picking up of measured values would then produce a high volume of data, it is convenient to provide a reduction in the amount of data.

One possibility for reducing the amount of data provides that the information carrier unit only stores a measured value in the memory area if it exceeds a threshold value.

This may take place, for example, by the information carrier unit constantly picking up the measured values, but the information carrier unit being prescribed a threshold value as from which the measured values are stored, so that normal states are not stored but only the measured values which do not correspond to a normal state defined by the threshold value.

These measured values are then stored in the simplest case as nothing more than measured values, in somewhat more complex cases as measured values with an indication of the time at which they were picked up, or with an indication of other circumstances in which these measured values were picked up.

As an alternative to this, an advantageous solution provides that the information carrier unit only stores in the memory area, measured values which lie outside a statistically determined normal measured value distribution.

With regard to the regions in which the state variables are determined by means of the sensor, no further details have been specified so far.

One suitable solution provides that the sensor picks up at least one state variable in the outer sheath of the cable, it being possible for this to be, for example, radiation, temperature, pressure, tension or elongation.

Another advantageous solution provides that the sensor picks up state variables between the shielding and the outer sheath of the cable.

For example, it is possible with such a solution to pick up relative movements between the shielding and the outer sheath of the cable.

These relative movements may reach an order of magnitude which causes irreversible damage to the cable and, for example, an increase in the friction between the screen and the outer sheath of the cable.

For example, these excessive relative movements may lead to a separating layer between the shielding and the outer sheath of the cable becoming damaged or the shielding becoming damaged.

These relative movements may, however, also occur as shearing stresses between the shielding and the outer sheath of the cable and be picked up as such by a shearing force sensor.

With regard to the way in which the sensor is formed, no further details have been specified so far.

It is advantageous if the sensor is a sensor which varies an electrical resistance in accordance with the physical state variable to be picked up, since an electrical resistance can be easily picked up.

An alternative or additional solution provides that the sensor is a sensor which varies a capacitance in accordance with the physical state variable to be measured, since capacitance can be easily picked up without great electrical power consumption.

Such a sensor can be realized particularly easily and at low cost by a layer structure, in particular a multilayer structure, since layer structures can be easily produced and easily adapted to the respective conditions.

With regard to the way in which the sensor is disposed in relation to the information carrier unit, furthermore, no further details have been specified.

One solution provides that the sensor is disposed outside an integrated circuit of the information carrier unit. This solution makes it possible to use the sensor, for example, for picking up tensile forces, shearing forces, elongations or excessive elongations. However, it is also conceivable to use the sensor for measuring radiation, temperatures or pressure at specific points of the cable, for example in the inner cable body or in the separating layer or in the cable sheath.

Such a solution makes it necessary, however, to produce and maintain a stable and lasting electrical connection between the sensor and the integrated circuit.

For these reasons, as an alternative to this, another suitable solution provides that the sensor is disposed on the integrated circuit. This solution has the advantage that the sensor can be produced with the integrated circuit in a simple manner and that far fewer problems occur in maintaining the sensor in working order, since the sensor and the part of the integrated circuit carrying it are fixedly connected to each other.

In the simplest case, the sensor may be provided as a component of the integrated circuit that picks up a temperature in the surroundings of the integrated circuit.

It is also conceivable, however, to form the sensor as a moisture sensor, which picks up the moisture occurring in the region of the integrated circuit.

With regard to the type of sensor and the way in which it is formed, no further details have been specified so far.

An advantageous exemplary embodiment provides that the sensor is a sensor which reacts irreversibly to the state variable to be picked up.

Such a sensor has the advantage that it reacts irreversibly when the state variable occurs, so that it is not necessary for the sensor, and in particular the information carrier unit, to be active at the point in time of the occurrence of the state variable to be picked up or the occurrence of the deviation in the state variable to be picked up. Rather, the sensor is capable at all later points in time of generating a measured value which corresponds to the state variable that was achieved at some point in time in the past.

As an alternative to this, it is provided that the sensor is a sensor which reacts reversibly with regard to the state variable to be picked up. In this case, it is necessary to activate the sensor when the state variable to be picked up occurs or when there is a change in the state variable to be picked up, in order to be able to pick up the measured value corresponding to this state variable.

Further features and advantages are the subject of the following description and the pictorial representation of some exemplary embodiments.

DETAILED DESCRIPTION OF THE INVENTION

Figure 1:
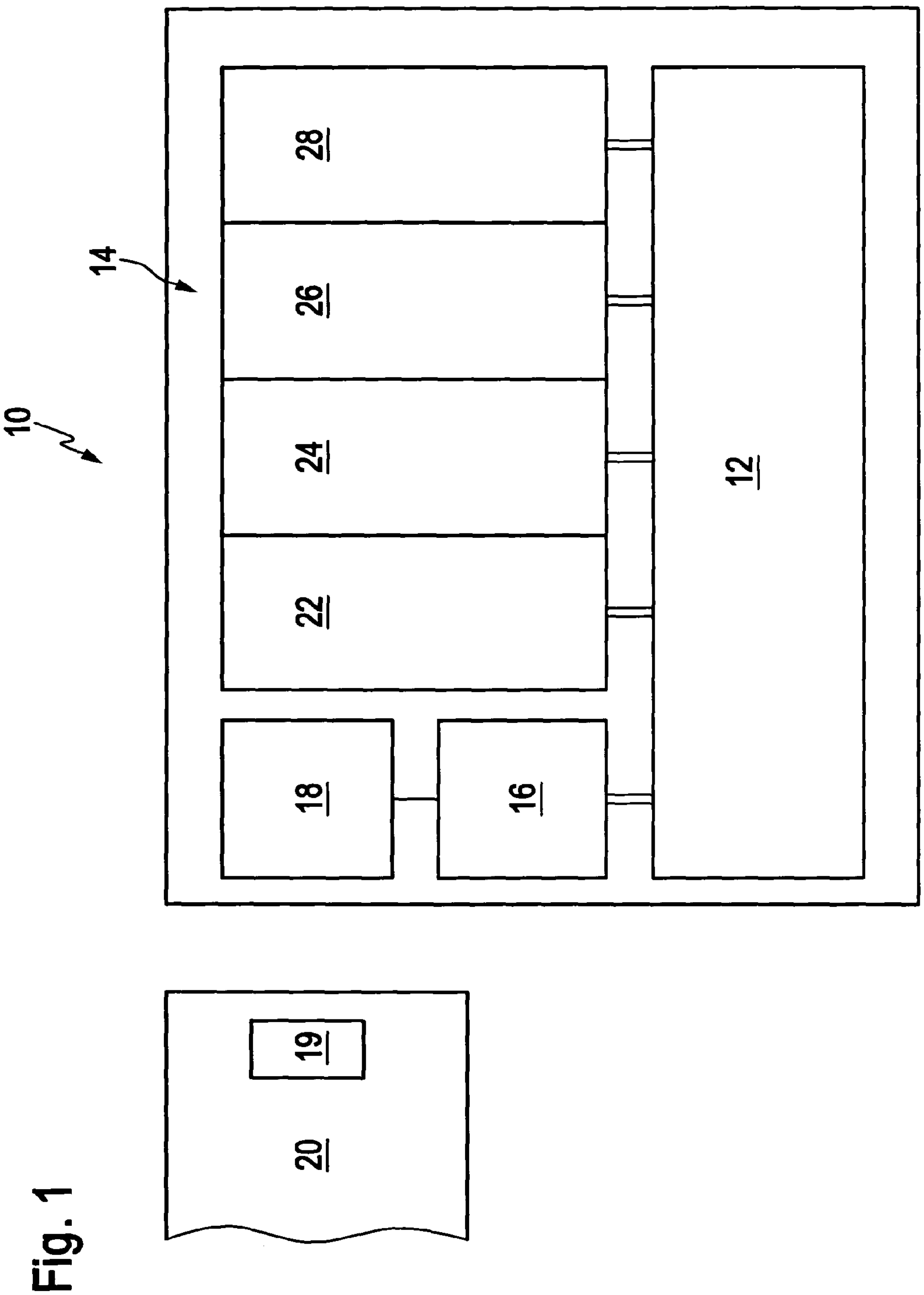
FIG. 1 shows a schematic block diagram of a first exemplary embodiment of an information carrier unit according to the invention.

An exemplary embodiment of an information carrier unit 10 to be used according to the invention and represented in FIG. 1 comprises a processor 12, to which a memory designated as a whole by 14 is linked, the memory preferably being formed as an EEPROM.

Also connected to the processor 12 is an analog part 16, which interacts with an antenna unit 18.

when there is electromagnetic coupling of the antenna unit 18 to an antenna unit 19 of a read/write device designated as a whole by 20, the analog part 16 is then capable on the one hand of generating, with the required power, the electrical operating voltage that is necessary for the operation of the processor 12 and the memory 14, as well as the analog part 16 itself, and on the other hand of making available to the processor 12 the information signals transmitted by electromagnetic field coupling at a carrier frequency or transmitting information signals generated by the processor 12 by way of the antenna unit 18 to the read/write device 20.

A very wide variety of carrier frequency ranges are possible thereby.

In an LF range of approximately 125 to approximately 135 kHz, the antenna unit 18 acts substantially as a second coil of a transformer, formed by the antenna unit 18 and the antenna unit 19 of the read/write device 20, energy and information transmission taking place substantially by way of the magnetic field.

In this frequency range, the range between the read/write device 20 and the antenna unit 18 is low, that is to say that, for example, the mobile read/write device 20 must be brought up very close to the antenna unit 18, to within less than 10 cm.

In an HF range between approximately 13 and approximately 14 MHz, the antenna unit 18 likewise acts substantially as a coil, good energy transmission with a sufficiently great range being possible as before in the interaction between the antenna unit 18 and the read/write device 20, the distance being, for example, less than 20 cm.

In the UHF range, the antenna unit 18 is formed as a dipole antenna, so that, when the power supply to the information carrier unit 10 does not take place by way of the mobile read/write device 20, a great range in the communication with the read/write device 20 can be realized, for example up to 3 m, the interaction between the read/write device 20 and the antenna unit 18 taking place by way of electromagnetic fields. The carrier frequencies are from approximately 850 to approximately 950 MHz or from approximately 2 to approximately 3 GHz or from approximately 5 to approximately 6 GHz. When the power is supplied by the mobile read/write device 20, the communication range is up to 50 cm.

Depending on the frequency range, therefore, the antenna units 18 are also differently formed. In the LF range, the antenna unit 18 is formed as a compact, for example wound, coil with an extent which may even be less than 1 $cm^2$. In the case of this frequency range, it can be assumed that a shielding provided in the cable has substantially no effect on the coupling between the antenna unit 18 and the read/write device 20.

In the HF range, the antenna unit 18 is likewise formed as a flat coil, which may also have a greater extent of the order of several square centimeters.

In the UHF range, the antenna unit 18 is formed as a dipole antenna of diverse configurations.

In the HF and UHF ranges, the presence of shielding in the cable has effects on the coupling between the antenna unit 18 and the read/write device 20.

The memory 14 interacting with the processor 12 is preferably divided into a number of memory areas 22 to 28, which can be written to in various ways.

For example, the memory area 22 is provided as a memory area which can be written to by the manufacturer and, for example, carries an identification code for the information carrier unit 10. This identification code is written in the memory field 22 by the manufacturer, and at the same time the memory area 22 is write-protected.

The memory area 24 can, for example, be provided with write protection which can be activated by the cable manufacturer, so that the cable manufacturer has the possibility of writing to the memory area 24 and securing the information in the memory area 24 by write protection. In this way, the processor 12 has the possibility of reading and outputting the information present in the memory area 24, but the information in the memory area 24 can no longer be overwritten by third parties.

For example, the information stored in the memory area 24 may be information concerning the kind or type of cable and/or technical specifications of the cable.

In the memory area 26 information is stored, for example by the purchaser of the cable, and write-protected. Here there is the possibility for the purchaser and user of the cable to store information concerning the installation and use of the cable and secure it by write protection.

In the memory area 28, information can be freely written and freely read, so that this memory area can be used for storing and reading information during the use of the information carrier unit in conjunction with a cable.

The exemplary embodiment of the information carrier unit 10 represented in FIG. 1 is a so-called passive information carrier unit, and consequently does not require an energy store, in particular an accumulator or battery, in order to interact and exchange information with the read/write device 20.

Figure 2:
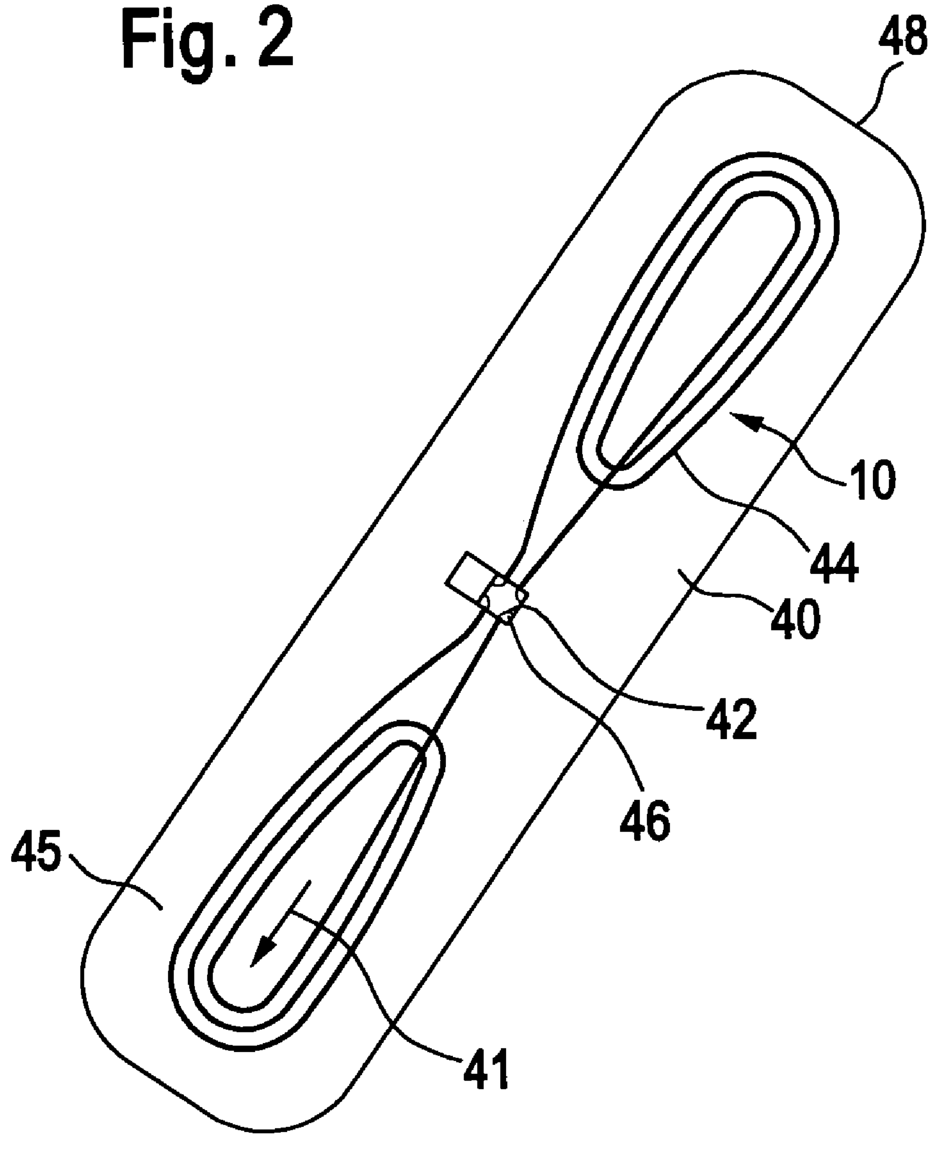
FIG. 2 shows a plan view of how the first exemplary embodiment of the information carrier unit according to the invention is realized.

In the case of the way in which the information carrier unit 10 is realized as represented in FIG. 2, a base 40 of said unit extends in a longitudinal direction 41 and carries an integrated circuit 42, which comprises the processor 12, the memory 14 and the analog part 16, as well as conductor tracks 44, which are provided on the base 40 and are formed, for example, for the HF range as coil loops extending in an antenna surface 45, and form the antenna unit 18. The conductor tracks 44 may in this case be applied to the base 40 by means of any desired form-selective coating processes, for example in the form of printing a conductive lacquer or a conductive paste.

If the information carrier unit 10 is of a great extent, the base 40 is, for example, a flexible material, in particular a pliant material, for example a plastic strip, to which on the one hand the conductor track 44 can be easily and permanently applied by coating and on the other hand the integrated circuit 42 can also be easily fixed, in particular in such a way that a permanent electrical connection can be realized between outer connecting points 46 of the integrated circuit 42 and the conductor tracks 44.

If the base 40 is formed as flat material, it is of advantage if it is formed with edge regions 48 with a blunt effect on their surroundings, in order to avoid damage to the surroundings of the base 40 in the cable during movement of the cable. This means in the case of a base 40 formed from a thin flat material that it has, for example, rounded corner regions and, if possible, also edges with a blunt effect, for example deburred edges.

Figure 3:
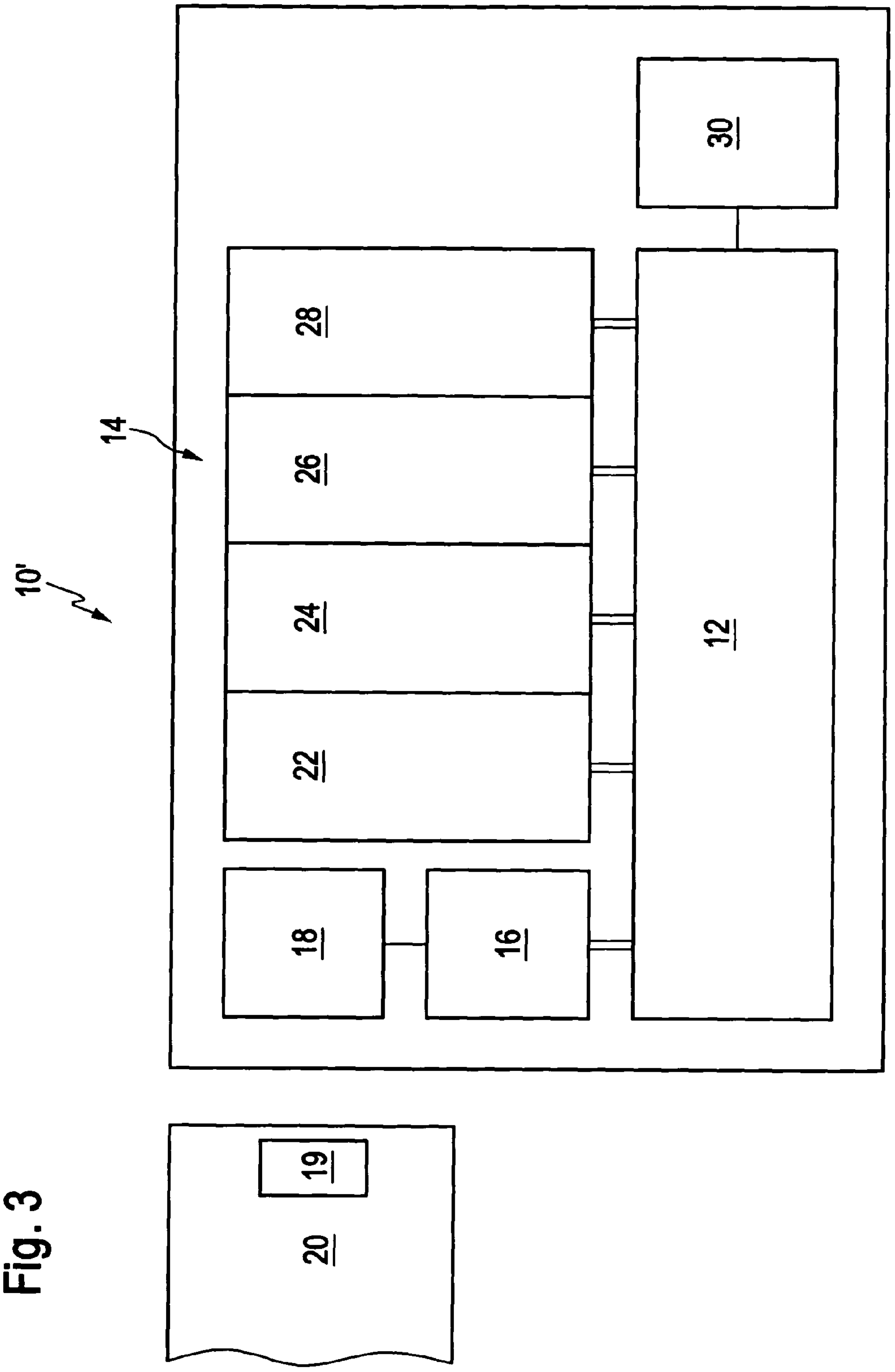
FIG. 3 shows a block diagram similar to FIG. 1 of a second exemplary embodiment of an information carrier unit according to the invention.

In the case of a second exemplary embodiment of an information carrier unit 10' according to the invention, represented in FIG. 3, those elements that are identical to those of the first exemplary embodiment are provided with the same reference numerals, so that, with regard to the description of the same, reference can be made to the first exemplary embodiment in its entirety.

By contrast with the first exemplary embodiment, in the case of the second exemplary embodiment the processor 12 also has an associated sensor 30, enabling the processor 12 to pick up physical variables of the cable, such as for example radiation, pressure, temperature, tension or moisture, and for example store corresponding values in the memory area 28.

The sensor 30 may in this case be formed in accordance with the field of use.

For example, it is conceivable to form the sensor 30 for measuring a pressure as a pressure-sensitive layer, it being possible for the pressure sensitivity to take place for example by way of a resistance measurement or, in the case of multiple layers, a capacitive measurement.

As an alternative to this, it is, for example, conceivable, for forming the sensor 30 as a temperature sensor, to form the sensor as a resistor that is variable with the temperature, so that a temperature measurement is possible by a resistance measurement.

If the sensor 30 is formed as a tension or elongation sensor, the sensor is formed, for example, as a strain gage, which changes its electrical resistance in accordance with elongation.

If, however, the sensor 30 is formed as a sensor reacting irreversibly to a specific elongation or to a specific tension, it is likewise possible to form the sensor as a sensor breaking an electrical connection, for example as a wire or conductor track for which the electrical connection is interrupted as from a specific tension or a specific elongation, by rupturing at a predetermined breaking point or by tearing, or goes over from a low resistance to a high resistance.

If appropriate, however, the tension measurement or the elongation measurement could also be realized by a capacitive measurement.

In the case of a moisture sensor, the sensor 30 is preferably formed as a multilayer structure which changes its electrical resistance or its capacitance in accordance with moisture.

Otherwise, the second exemplary embodiment according to FIG. 2 operates in the same way as the first exemplary embodiment.

Figure 4:
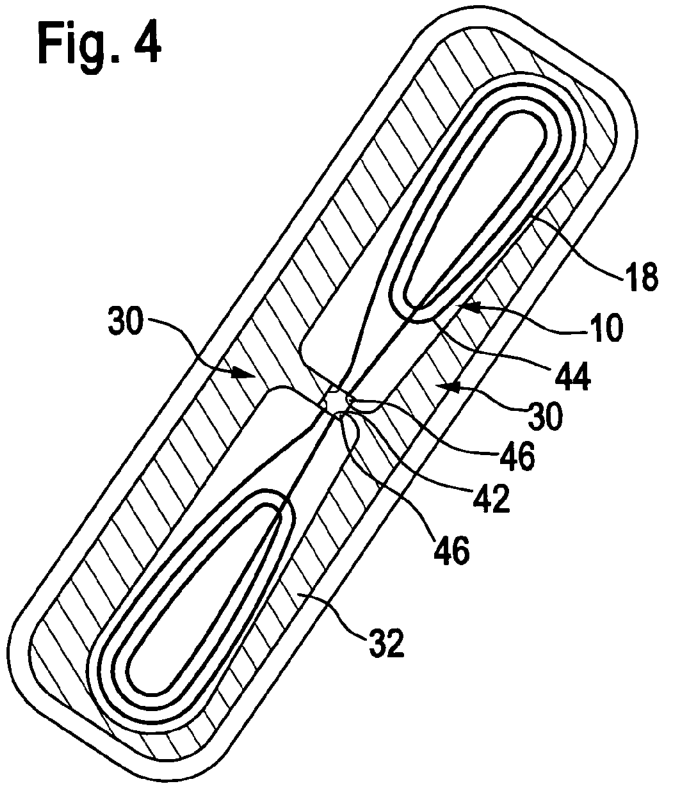
FIG. 4 shows a plan view similar to FIG. 2 of how the second exemplary embodiment of the information carrier unit according to the invention is realized.

If the second exemplary embodiment is realized as represented in FIG. 4, the information carrier unit 10' also comprises the sensor 30, which may, for example, be a radiation sensor for all types of physical radiation, a temperature sensor, a tension or elongation sensor or a moisture sensor, which is formed over a large area as a layer 32 and is disposed on the base 40 along with the antenna unit 18, as represented in FIG. 4.

Figure 5:
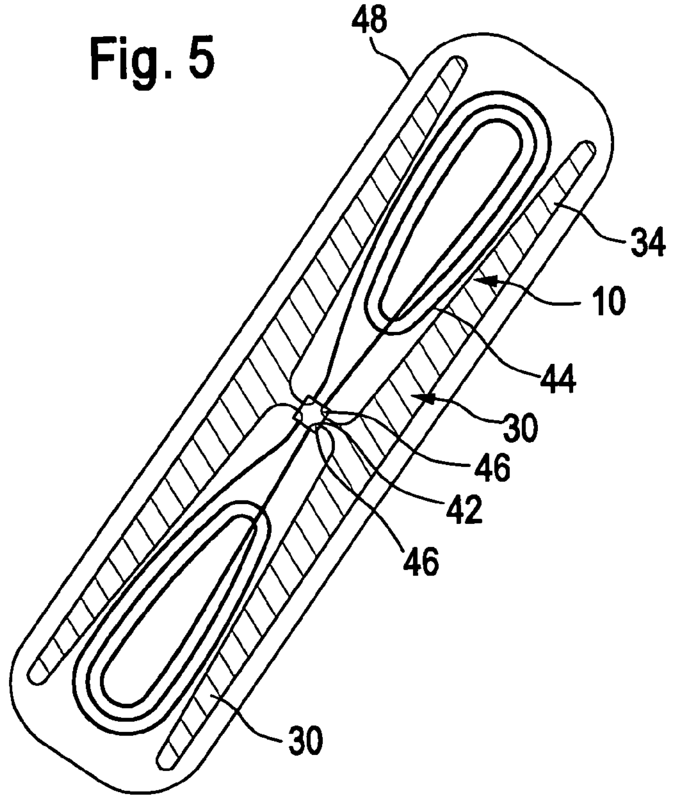
FIG. 5 shows a plan view similar to FIG. 4 of a variant of the second exemplary embodiment of the information carrier unit according to the invention.

In the case of a variant of the second exemplary embodiment that is represented in FIG. 5, the sensor 30 is formed as a multilayer structure 34 and can consequently be operated with a space-saving structure as a capacitive sensor 30. In this case, moisture, temperature or pressure can be easily picked up in particular on the basis of the state-dependent capacitance.

Such a sensor 30 can be easily contacted by the integrated circuit or be formed as part of the same.

Figure 6:
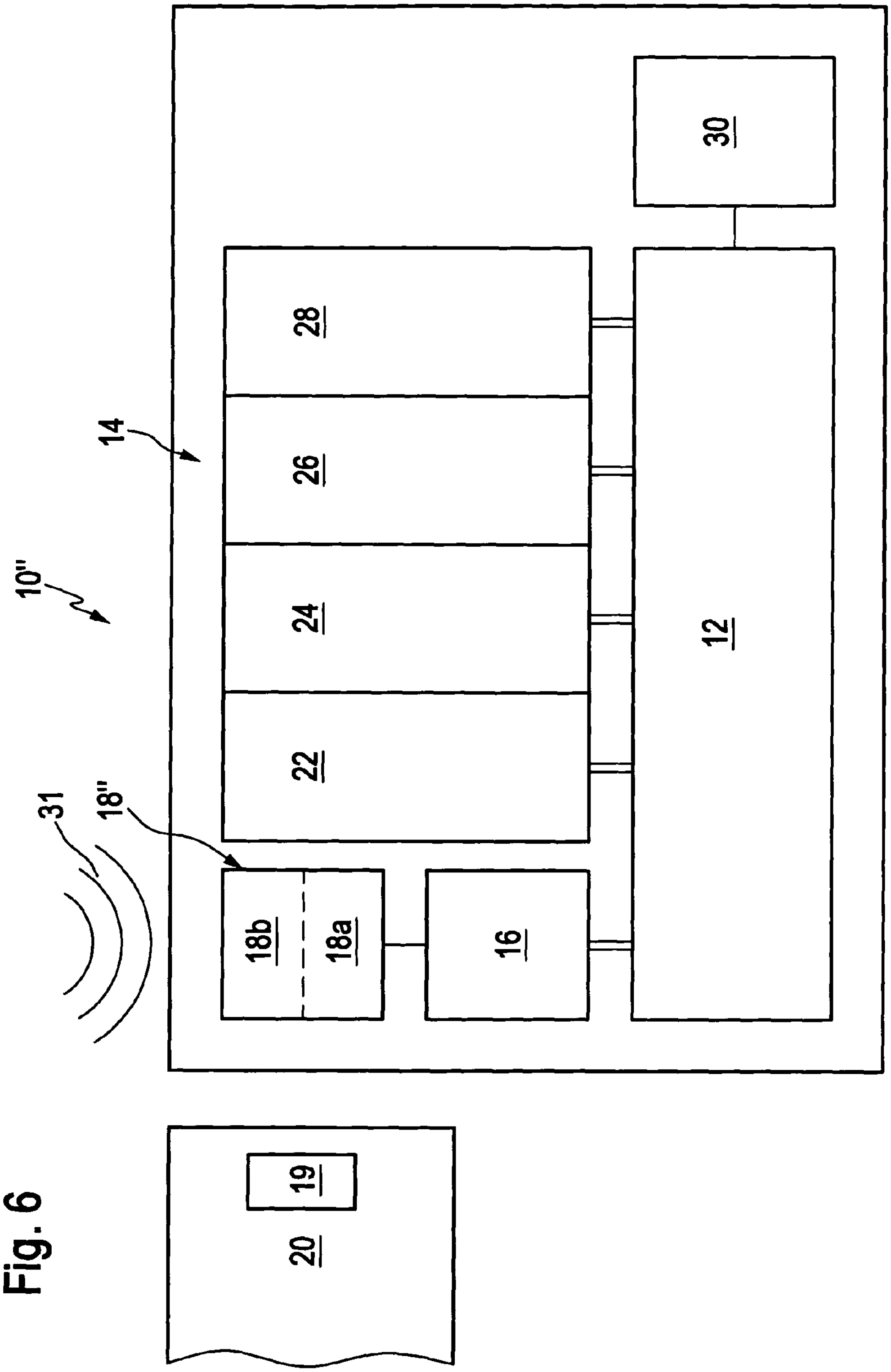
FIG. 6 shows a block diagram similar to FIG. 1 of a third exemplary embodiment of an information carrier unit according to the invention.

By contrast with the second exemplary embodiment, in the case of a third exemplary embodiment 10", represented in FIG. 6, the analog part 16 has an associated antenna unit 18", which has a two-part effect, to be specific for example an antenna part 18*a*, which communicates in a known way with the read/write device 20, and an antenna part 18*b*, which is capable by induction of coupling to an alternating magnetic field 31 and drawing energy from it, in order to operate the information carrier unit 10" independently of the read/write device 20 with this energy drawn from the alternating magnetic field 31.

For example, the alternating magnetic field 31 can be produced by the leakage field of an alternating current line which is connected, for example, to an AC voltage source with 50 Hz. It is in this way possible to supply the information carrier unit 10" with energy as long as the alternating field 31 exists, irrespective of whether the read/write device 20 is intended to be used for writing or reading information.

Supplying the information carrier unit 10" with electrical energy in such a way, independently of the read/write device 20, is useful in particular if the sensor 30 is intended to be used over relatively long time periods for picking up a physical variable which is not intended to coincide with the time period during which the read/write device 20 is coupled to the antenna unit 18*a* but to be independent of it.

Consequently, for example, the information carrier unit 10" can be activated by switching on the alternating magnetic field 31, so that physical state variables can be measured on the part of the sensor 30 and picked up by way of the processor 12, and for example stored in the memory area 28, independently of the question as to whether or not the read/write device 20 is coupled with the antenna unit 18.

For example, the alternating magnetic field 31 may be produced by the stray field of a data line, a control line, a pulsed power line or an alternating current line, which is, for example, connected to an AC voltage source with 50 Hz or a higher frequency. It is in this way possible to supply the information carrier unit 10" with energy as long as the alternating field 31 exists, irrespective of whether the read/write device 20 is intended to be used for writing or reading information.

The frequency of the alternating field 31 and the resonant frequency of the antenna part 18*b* can be made to match each other in such a way that the antenna part 18*b* is operated in resonance, and consequently allows optimum coupling-in of energy from the alternating field 31.

Supplying the information carrier unit 10" with electrical energy in such a way, independently of the read/write device 20, is useful in particular if the sensor 30 is intended to be used over relatively long time periods for picking up a physical state variable which is not intended to coincide with the time period during which the read/write device 20 is coupled to the antenna unit 18*a* but to be independent of it.

Consequently, for example, the information carrier unit 10" can be activated by switching on the alternating electromagnetic field 31, so that physical state variables can be measured on the part of the sensor 30 and picked up by way of the processor 12, and for example stored in the memory area 28, independently of the question as to whether or not the read/write device 20 is coupled with the antenna unit 18".

Figure 7:
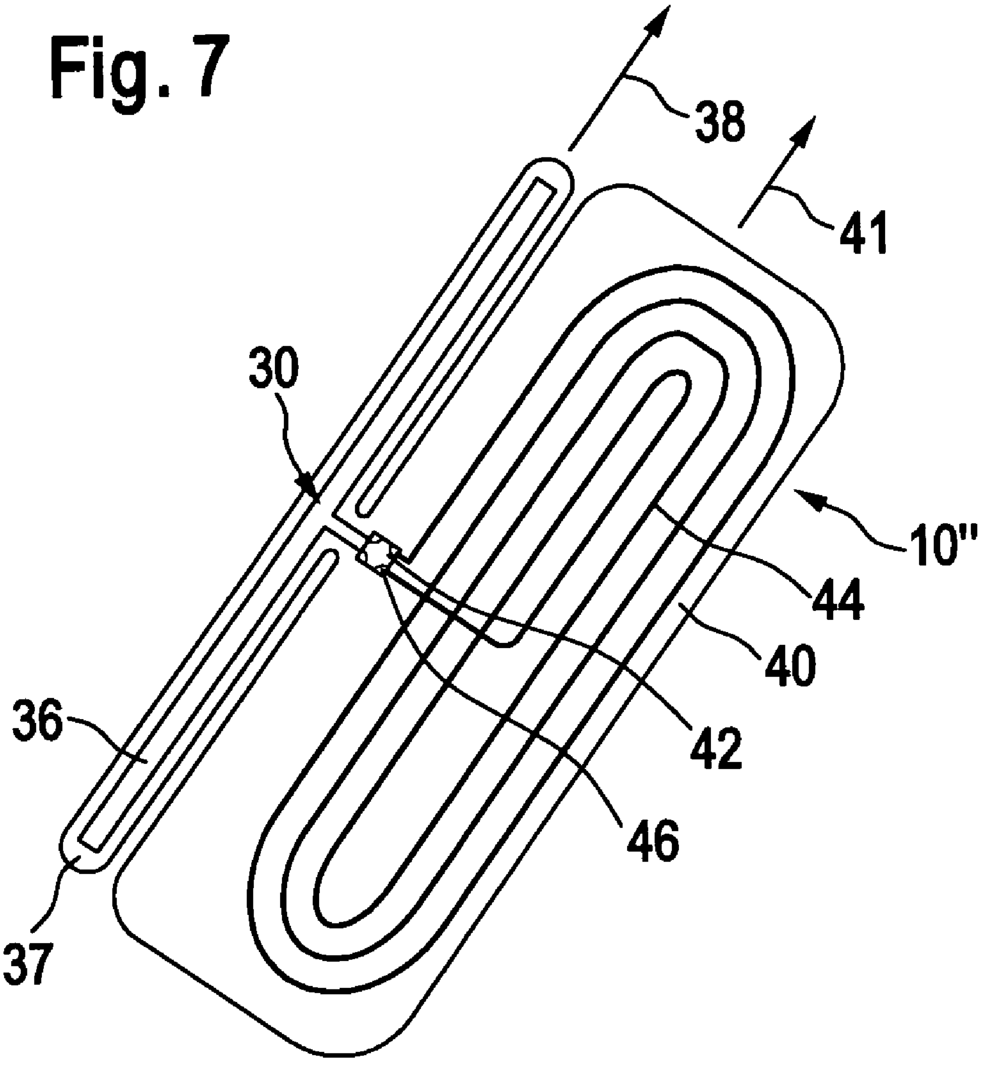
FIG. 7 shows a plan view similar to FIG. 2 of how the third exemplary embodiment of the information carrier unit according to the invention is realized.

If the third exemplary embodiment is realized as represented in FIG. 7, the sensor 30 is formed as a strain gage 36, which in the case of this exemplary embodiment is disposed on a substrate 37 which is connected to the base 40 and can be elongated in a longitudinal direction 38 of the strain gage 36.

In the case of this exemplary embodiment, the substrate 37 together with the strain gage 36 can be advantageously fixed on the part to be measured or embedded in it, so that the elongation of this part or of the surroundings of the substrate 37 is transmitted to the substrate 37, and consequently the substrate 37 can pick up the elongation of its surroundings and transmit it to the strain gage 36 in an unfalsified manner.

In the case of this exemplary embodiment, the longitudinal direction 38 runs, for example, parallel to the direction 41, which represents a longitudinal direction of the base 40, but may also run transversely thereto.

Consequently, provided that the strain gage 36 is fixedly connected to a component part of the cable that can undergo elongation, in the case of this information carrier unit 10", it is possible for elongations in the longitudinal direction 38 of the strain gage 36 to be measured and to be picked up on the part of the processor 12 on the integrated circuit 42.

An information carrier unit corresponding to the exemplary embodiments described above can be used according to the invention in different variants for a cable.

Figure 8:
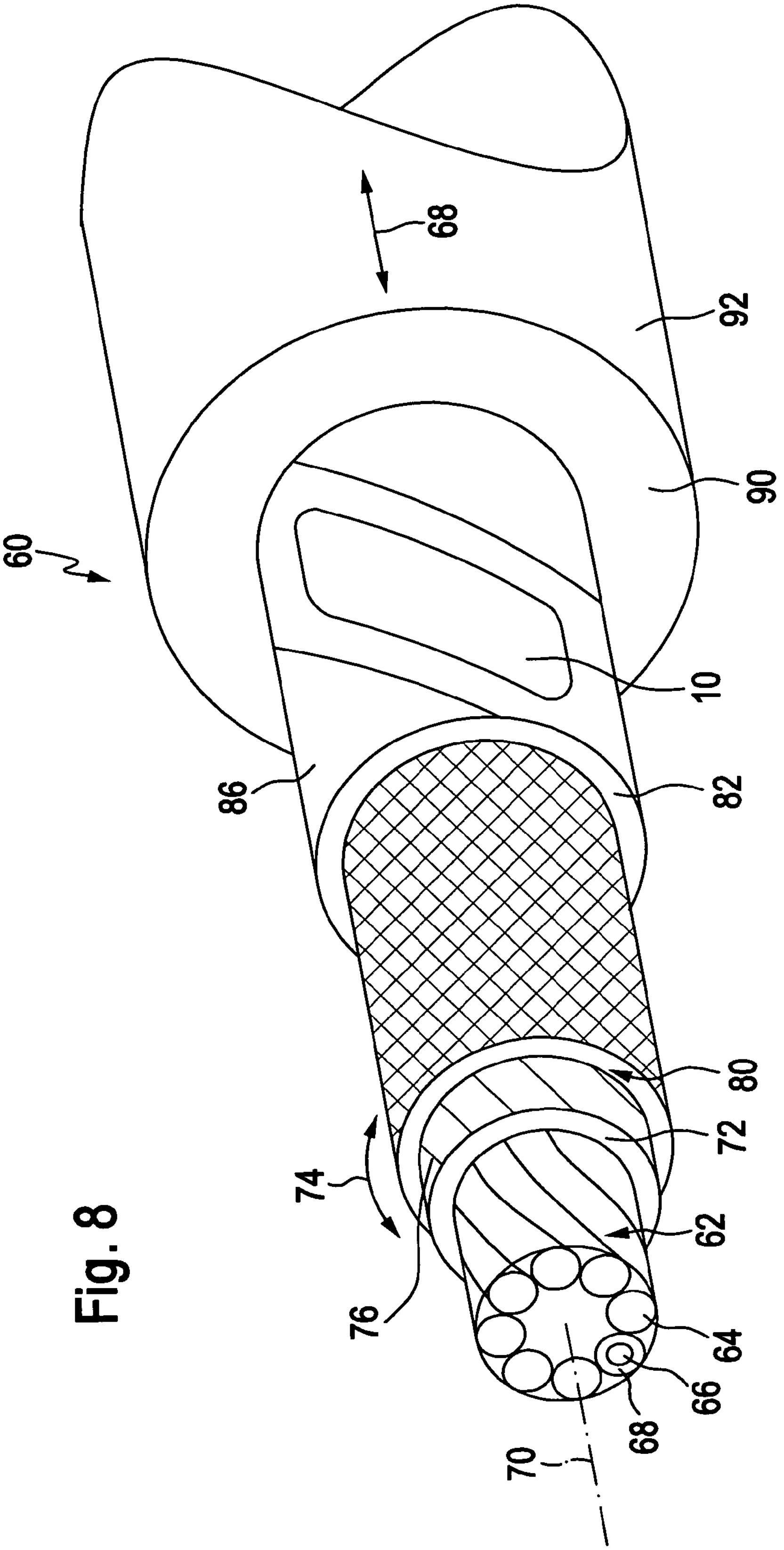
FIG. 8 shows a perspective representation of individual parts of the structure of a first exemplary embodiment of a cable according to the invention.

A first exemplary embodiment of a cable 60 according to the invention, represented in FIG. 8, comprises an inner cable body 62, in which a number of electrical conductor strands 64 run, the electrical conductor strands 64 respectively comprising, for example, a core 66 of an electrical or optical conductor, which for its part is again insulated.

In this case, the conductor strands 64 are preferably twisted with one another about a longitudinal axis 70 running parallel to a longitudinal direction 69 of the cable 60, that is to say they lie disposed about the longitudinal axis 70 and run at an angle to a parallel to the longitudinal axis 70 that intersects the respective conductor strand 64.

The inner cable body 62 is enclosed by a first separating layer 72, which is formed, for example, as a protective film and completely encloses the inner cable body 62 in a circumferential direction. For example, the separating layer 72 is wound in the form of one or more strips 76 around the inner cable body 62 and encloses the latter completely in the circumferential direction 74.

The separating layer 72 thereby separates the inner cable body 62 from a shielding 80, which likewise encloses the inner cable body 62 and the separating layer 72 completely in the circumferential direction 74, and consequently protects the inner cable body 62, in particular the conductor strands 64, from electromagnetic interference, and on the other hand also prevents electromagnetic emissions from it.

In the case of this exemplary embodiment, the shielding 80 is covered by a second separating layer 82, which likewise again completely encloses the screen 80. The second separating layer 82 may in this case be formed as a filler tape which runs in the direction of the longitudinal axis 70 and encloses the shielding 80, or likewise by strips 86 wound around the shielding 80, for example in an overlapping manner, for example formed from a continuous material or some other material.

The second separating layer 82 is once again enclosed by an outer cable sheath 90, which is preferably produced during the production of the cable 60 by extrusion and likewise completely encloses the second separating layer 82 in the circumferential direction 76. The outer cable sheath 90 usually adheres to the second separating layer 82.

The outer cable sheath 90 for its part forms an outer sheath surface 92 of the cable, defining the outer contour of the cable 60.

Figure 9:
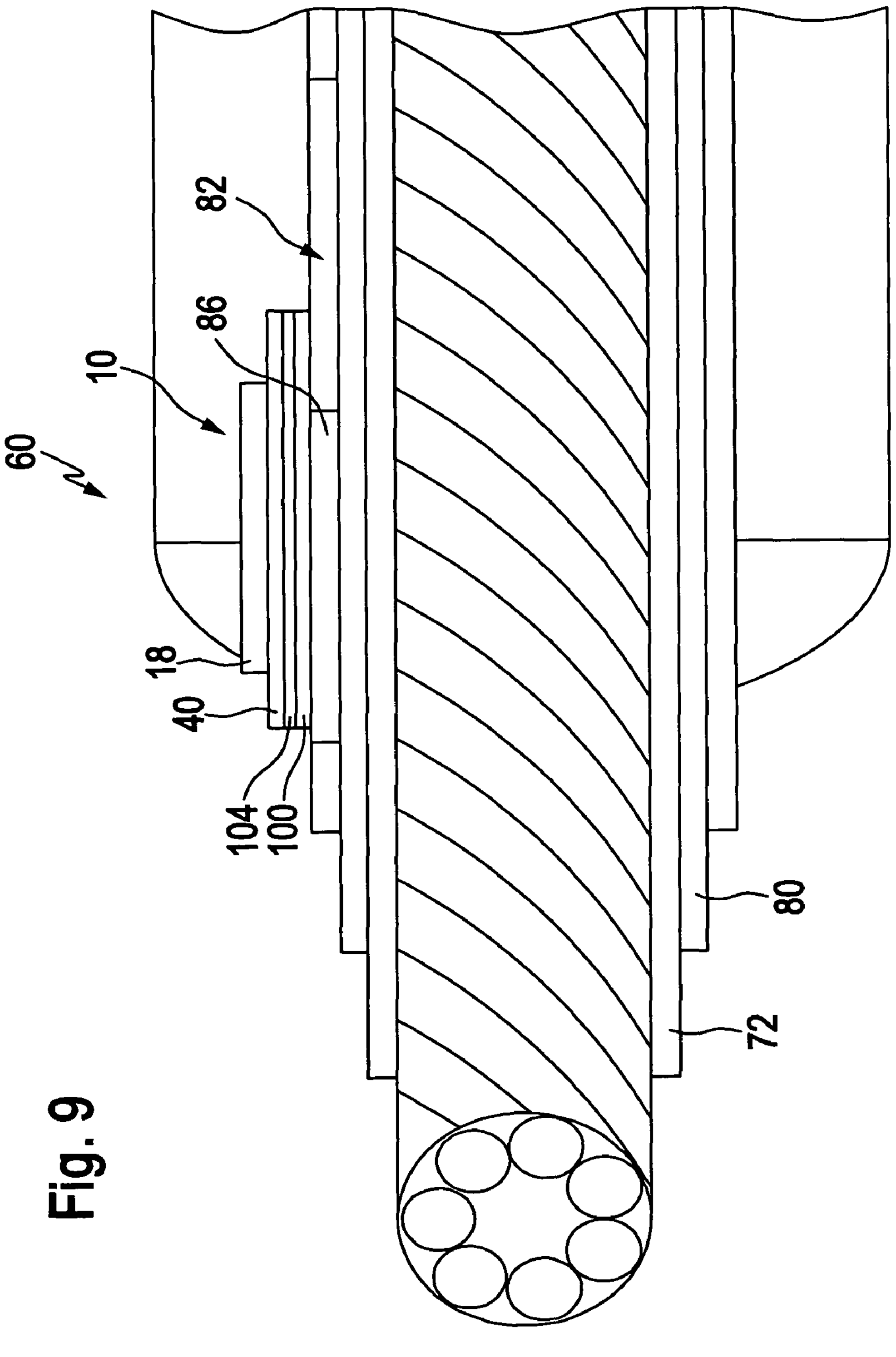
FIG. 9 shows a section through the first exemplary embodiment in the region of the information carrier unit.

In the case of the first exemplary embodiment of a cable 60 according to the invention, represented in FIG. 8, one of the strips 86 carries, for example, the information carrier unit 10 according to the first exemplary embodiment described, the information carrier unit 10, as represented in FIG. 9, being disposed on the strip 86, which in this case represents a carrier strip for the information carrier unit 10. When the cable 60 according to the invention is produced, one or more information carrier units 10 are also incorporated in the cable with the strip 86 by winding said strip 86 around the shielding 80.

For example, the base 40 of the information carrier unit 10 is then fixed on the strip 86 by means of a flexible and elastic adhesive layer 100.

Figure 10:
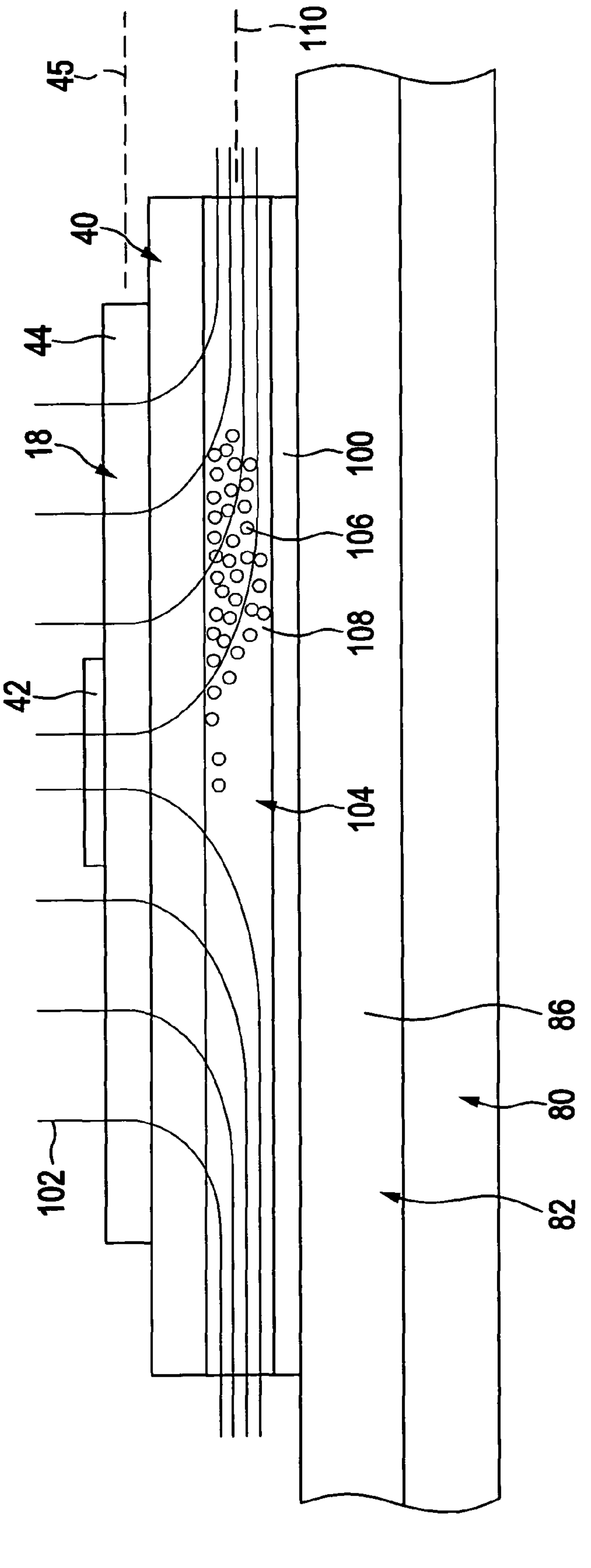
FIG. 10 shows an enlarged representation of the conditions in the region of the information carrier unit shown in section in FIG. 9.

For the communication between the read/write device 20 and the information carrier unit 10, there forms in the HF range a magnetic field 102 (FIG. 10), which couples the antenna unit 19 of the read/write device 20 and the antenna unit 18 of the identification unit 10 with each other. To avoid eddy currents caused by this electromagnetic field 102 in the shield 80 by field induction and the opposing field building up as a result, which weakens the electromagnetic field 102, provided between the base 40 and the adhesive layer 100 is a magnetic-field-concentrating layer 104, which concentrates the magnetic field 102 that passes through the antenna surface 45, and consequently also the antenna unit 18, and thereby keeps it away from the shielding 80, so that the antenna unit 19 of the read/write device 20 and the antenna unit 18 of the information carrier unit 10 can be coupled by way of the electromagnetic field 102 with a sufficiently great degree of coupling, and consequently make communication between the read/write device 20 and the identification unit 10 possible to an extent which corresponds approximately or virtually to the conditions of a cable without such shielding 80.

In this case, the magnetic-field-concentrating layer 104 is formed as a layer in which magnetically conductive particles 106 are disposed, embedded in an electrically insulating embedding material 108, for example a resin or plastics material.

Such magnetically conductive particles 106 are, for example, particles of ferrite, in particular magnetite, which are electrically nonconductive, or of metal alloys, which may be electrically conductive. The particles have, for example, a particle size in the range between approximately 1 μm and approximately 50 μm, still better in the range between approximately 2 μm and approximately 20 μm.

The magnetic-field-concentrating layer 104, which extends in an area of extent 110 running approximately parallel to the antenna surface 45, provides the possibility of allowing a magnetic flux in the direction of the area of extent 110 within the magnetic-field-concentrating layer 104, which in turn makes a sufficiently great magnetic flux through the antenna surface 45 possible without the electromagnetic shielding effect of the shielding 80 having a disturbing influence, that is to say an influence reducing the magnetic flux through the antenna unit 18, since the magnetic-field-concentrating layer 104 for its part shields the shielding 80 substantially completely from the magnetic flux produced by the antenna unit 19 of the read/write device 20 and directs it in a substantially concentrated form in the magnetic-field-concentrating layer 104.

Furthermore, in the case of this exemplary embodiment, the base 40 is produced from an electrically inert material, so that the base 40 has no influence on the magnetic field 102.

In the case of this exemplary embodiment, on account of the shape of the cable 60, the antenna surface 45 is usually a surface which runs in an approximately cylindrical manner with respect to the longitudinal axis 70, the cylindrical shape not necessarily having to be a circular cross-sectional shape, but may also comprise other cross-sectional shapes, such as for example an oval cross-sectional shape.

In the same way, the area of extent 110 is also a surface which is likewise approximately cylindrical with respect to the longitudinal axis 70 of the cable 60, the area of extent 110 and the antenna surface 45 preferably running at a substantially constant spacing from each other and consequently in each case having a substantially similar cross-sectional shape.

Figure 11:
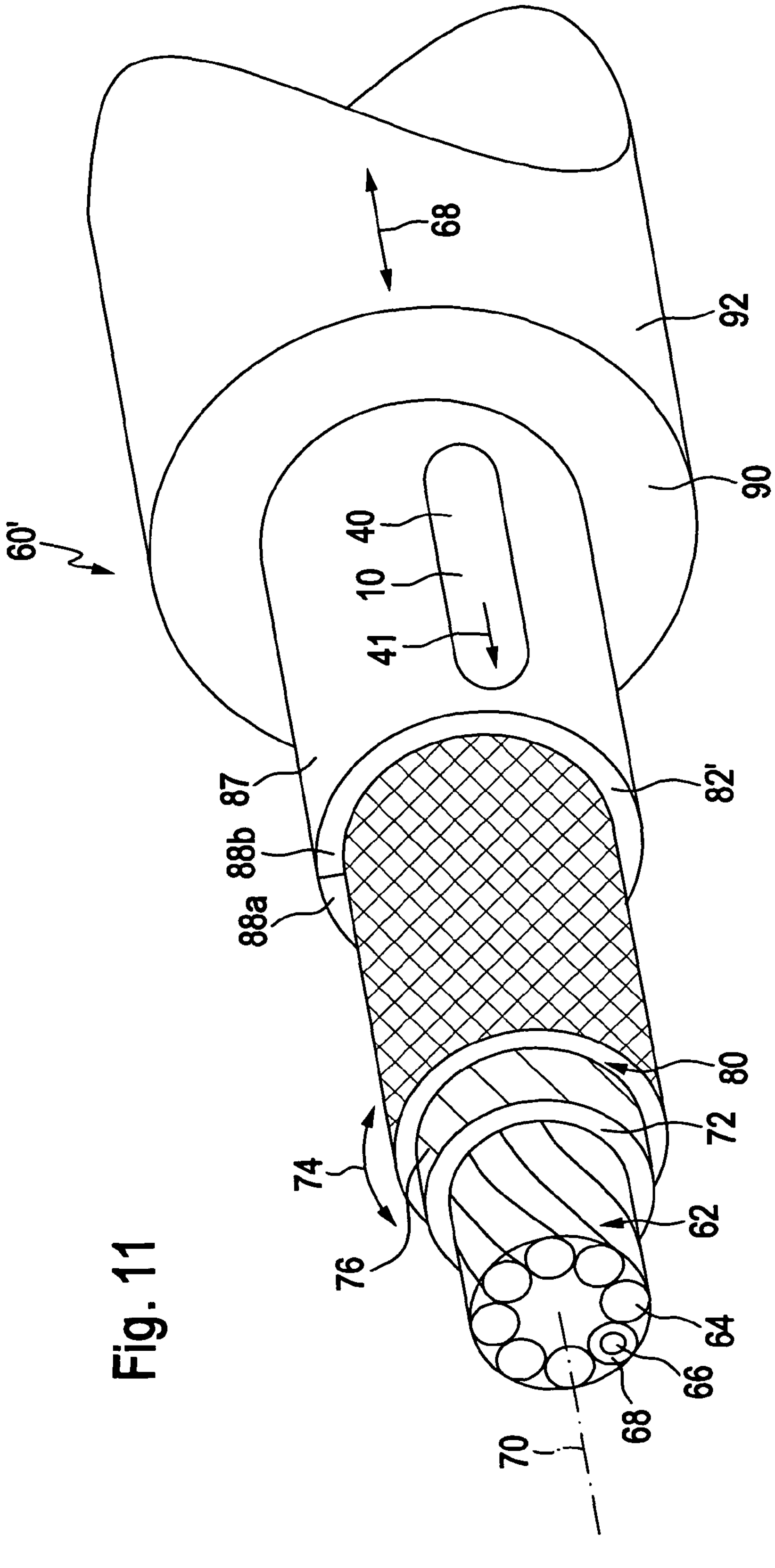
FIG. 11 shows a perspective representation similar to FIG. 8 of a second exemplary embodiment of a cable according to the invention.

In the case of a second exemplary embodiment of a cable 60' according to the invention, represented in FIG. 11, the second separating layer 82' is not formed by strips 86 but by a strip 87 which wraps around the shielding 80 completely like a filler tape, extends substantially parallel to the longitudinal axis 70 and the edges 88*a* and 88*b* of which approximately abut each other or overlap.

Figure 12:
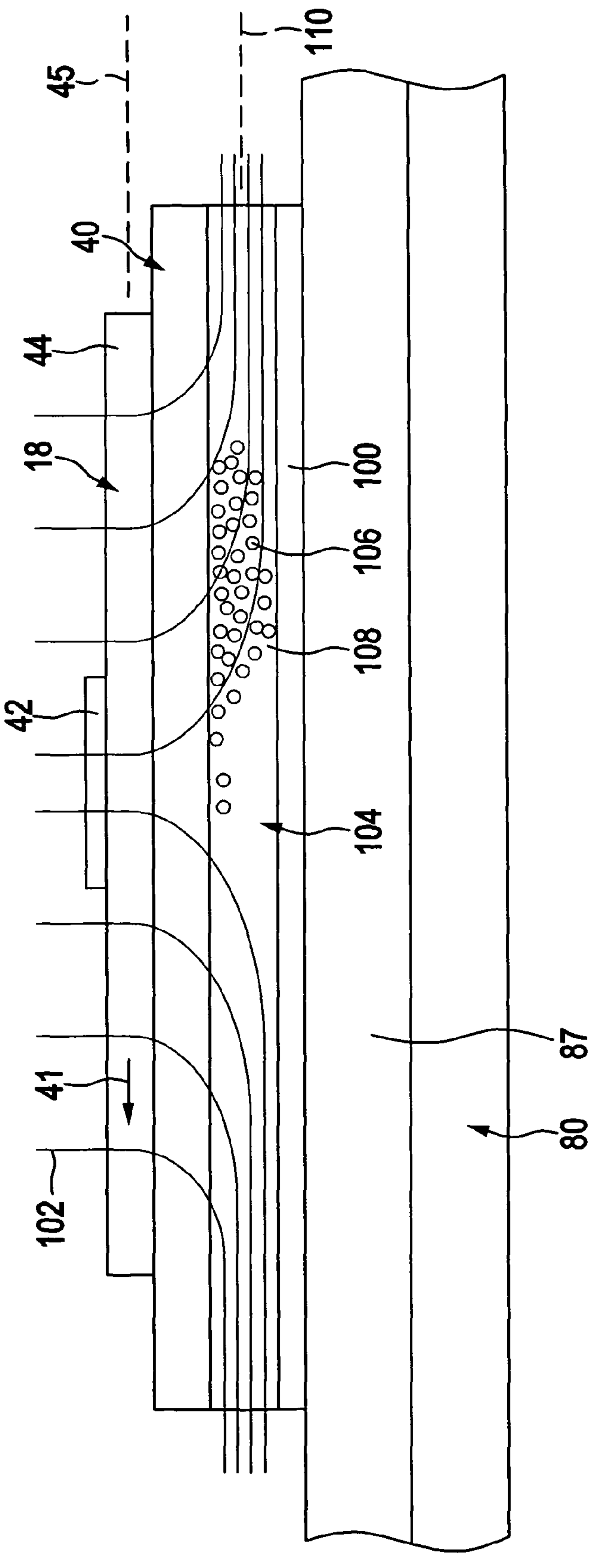
FIG. 12 shows an enlarged representation similar to FIG. 10 of the second exemplary embodiment of the cable according to the invention.

In this case, the identification unit 10, as represented in FIG. 11, may extend or be aligned with the longitudinal direction 41 of the base 40 approximately parallel to the longitudinal axis 70, the identification unit 10 being disposed and held on the separating layer in the same way as in the case of the first exemplary embodiment, as represented in FIG. 12.

Otherwise, there is likewise a magnetic-field-concentrating layer 104, which acts in the same way as in the case of the first exemplary embodiment.

Figure 13:
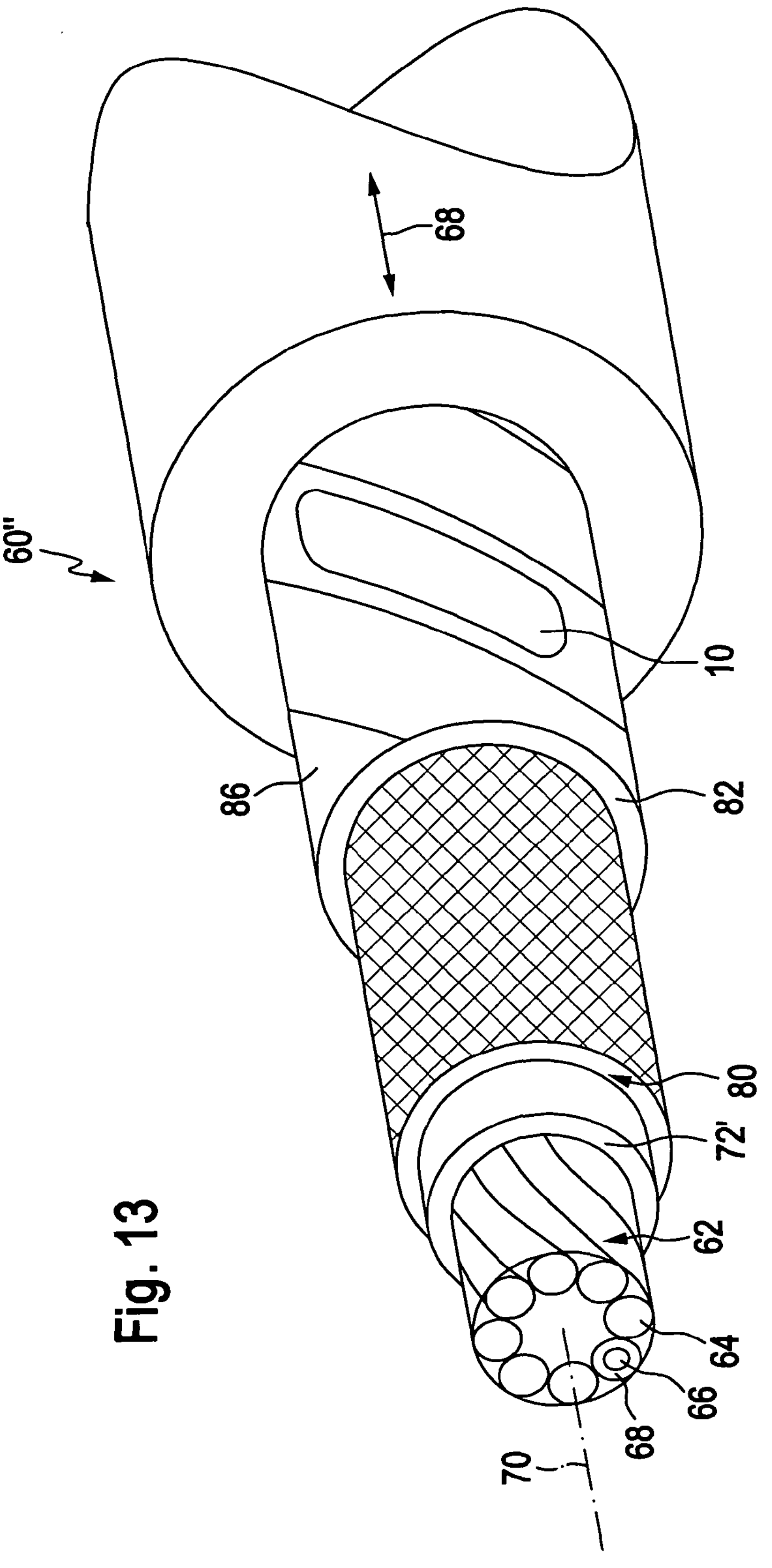
FIG. 13 shows a perspective representation similar to FIG. 8 of a third exemplary embodiment of a cable according to the invention.

By contrast with the first and second exemplary embodiments; in the case of a third exemplary embodiment of a cable 60'' according to the invention, represented in FIG. 13, the separating layer 72' is not formed as a film but is formed by an inner sheath 72', which is extruded onto the inner cable body 62 and encloses it over its complete area.

Lying on this inner sheath 72' there is then the shielding 80, which is formed in the same way as in the case of the first exemplary embodiment, and the shielding 80 is again surrounded by a second separating layer 82, which is likewise formed in the same way as in the case of the first exemplary embodiment, the identification unit 10, which is also formed in the same way as in the case of the first exemplary embodiment, being disposed on one of the strips 86 of the second separating layer 82, for example in a manner according to the first exemplary embodiment.

Figure 14:
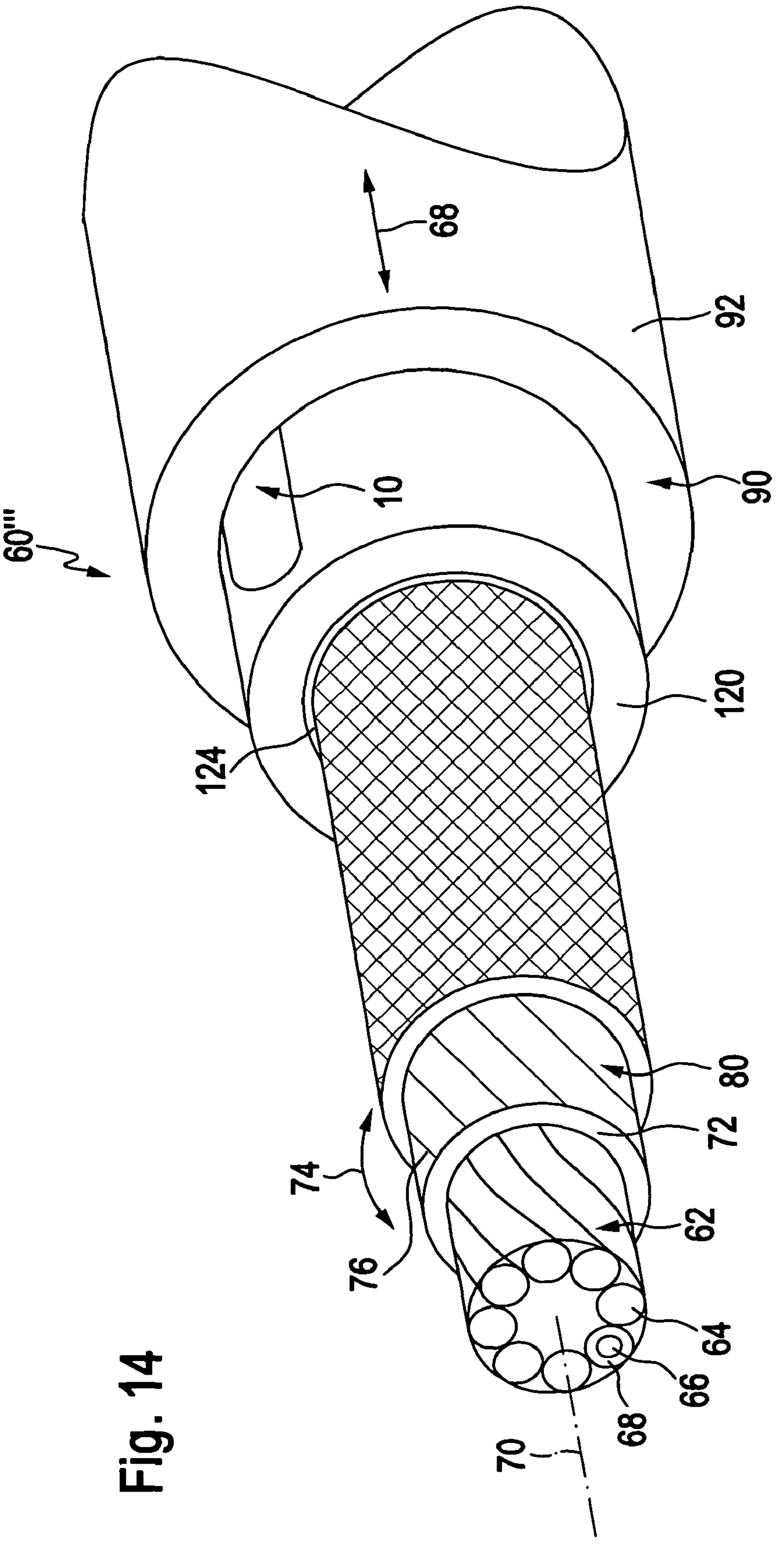
FIG. 14 shows a perspective representation similar to FIG. 8 of a fourth exemplary embodiment of a cable according to the invention.

In the case of a fourth exemplary embodiment of a cable 60''' according to the invention, represented in FIG. 14, the structure with respect to the inner cable body 62 and the first separating layer 72 is identical to that of the first exemplary embodiment, for example. However, the shielding 80 is enclosed by an intermediate sheath 120, which is extruded onto the shielding 80 and consequently likewise encloses the latter over its complete area. The intermediate sheath 120 is then for its part once again enclosed by the outer cable sheath 90.

In the case of highly flexible cables, however, the second separating layer 82 may also be provided between the shielding 80 and the intermediate sheath 120.

Figure 15:
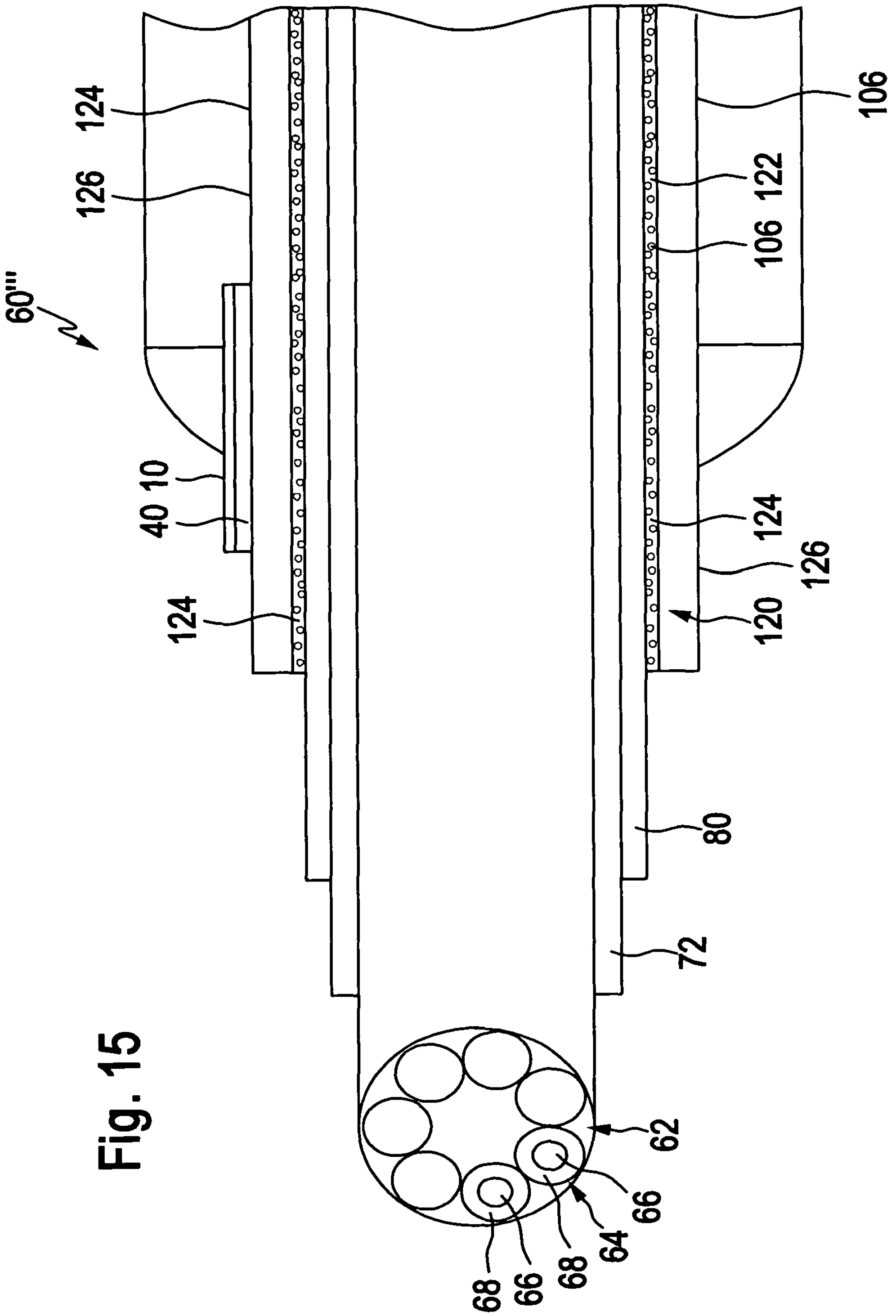
FIG. 15 shows a section similar to FIG. 9 through the fourth exemplary embodiment of the cable according to the invention in the region of the information carrier unit.

In the case of this fourth exemplary embodiment, the information carrier unit 10 in this case is on the intermediate sheath 120, as represented in FIG. 14 and FIG. 15, which sheath encloses the shielding 80 completely, as represented in FIG. 15.

In the case of this exemplary embodiment, the intermediate sheath 120 preferably comprises a magnetic-field-concentrating layer 124, the magnetic-field-concentrating layer 124 being obtainable, for example, by embedding magnetically conductive particles 106 in a surface region 122 of the material of the intermediate sheath 120 that faces the shielding 80, this being possible by dusting of the surface of the shielding 80 before the extrusion of the intermediate sheath 120, by incorporating the magnetically conductive particles 106 into the surface material region 122 that is in the softened state during the extrusion of the intermediate sheath 120.

Such an intermediate sheath 120 enclosing a magnetic-field-concentrating layer 124 has the overall effect of giving the cable 60''' improved properties, since it improves the shielding effect for electromagnetic radiation that is brought about by the electrical shielding 82 for the magnetic field component also.

At the same time, the magnetic-field-concentrating layer 124 of the intermediate sheath 120 serves for guiding the magnetic field 102, which passes through the antenna surface 45 and serves for the coupling between the antenna unit 19 of the read/write device 20 and the antenna unit 18 of the identification unit 10, in the same way as described for example in conjunction with the first exemplary embodiment of the cable according to the invention, but with the difference that in this case the magnetic-field-concentrating layer 124 extends over the entire cable in the direction of the longitudinal axis 70 and also completely encloses the inner cable body 62.

As an alternative to this, however, it is also conceivable to apply a magnetic field-concentrating layer 124 in a merely locally limited manner, by dusting or powdering the still soft material 122 of the shielding 80, to be specific in the region in which placement of the identification unit 10 is intended, so that a lower-cost solution is available on account of the saving in magnetically conductive particles 106, in particular in all those cases in which a complete magnetic-field-concentrating layer 124 surrounding the inner cable body 62 does not offer any advantages.

In the case of this exemplary embodiment, the information carrier unit 10 is, for example, likewise placed with the base 40 onto the intermediate sheath 120, for example in the region of the surface 126 facing away from the inner cable body 62, and, for example, adhesively attached by an adhesive layer 100.

As represented in FIG. 15, the outer cable sheath 90 covers the inner cable sheath 120 in the region of its surface 126 and also in this case embeds the information carrier unit 10, so that the information carrier unit is securely fixed in the cable 60'''.

Figure 16:
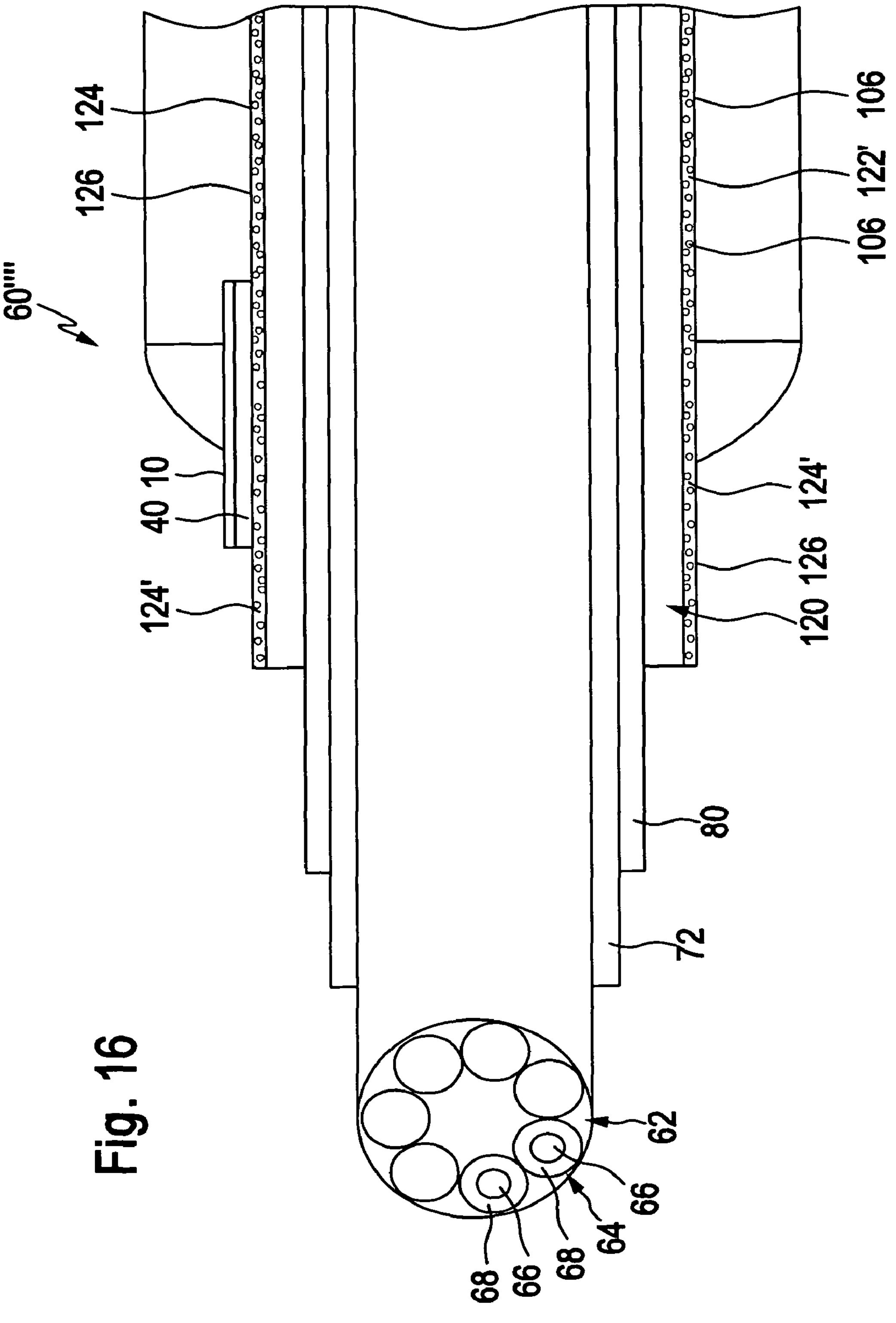
FIG. 16 shows a section similar to FIG. 9 through a fifth exemplary embodiment of the cable according to the invention in the region of the information carrier unit.

By contrast with the fourth exemplary embodiment, in the case of a fifth exemplary embodiment of a cable 60'''' according to the invention, represented in FIG. 16, the magnetic-field-concentrating layer 124' is disposed on a side of the intermediate sheath 120 that is facing away from the shielding 80 and is produced by dusting, powdering or sprinkling the material 122' of the intermediate sheath 120 that is still soft, or softened by subsequent heating, after extrusion of said sheath, so that the base 40 of the information carrier unit 10 is placed onto the magnetic-field-concentrating layer 124' and, for example, fixed by the adhesive layer 100.

Figure 17:
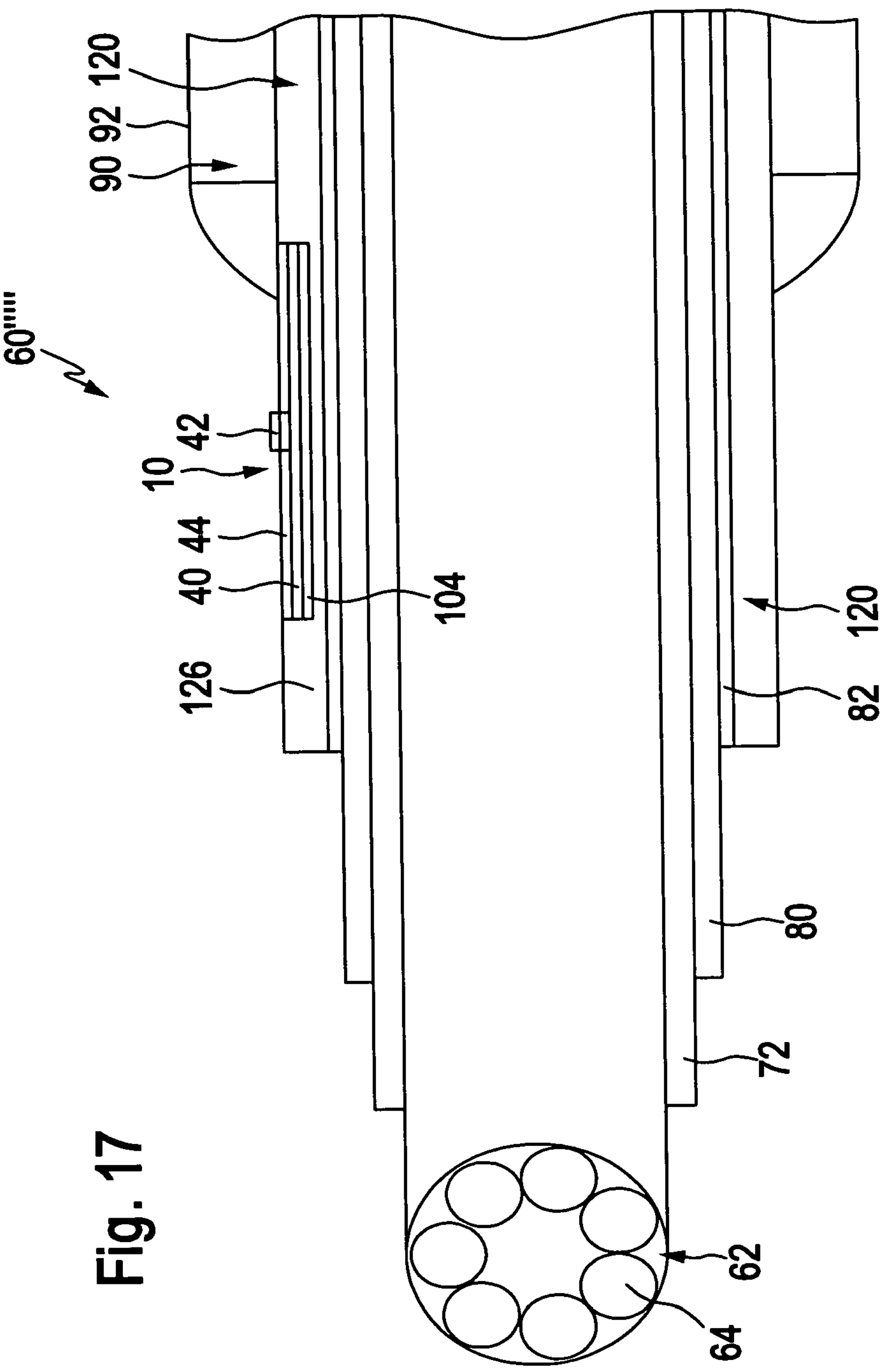
FIG. 17 shows a section similar to FIG. 9 through a sixth exemplary embodiment of a cable according to the invention.

In the case of a sixth exemplary embodiment of a cable 60''''' according to the invention, represented in FIG. 17, the structure corresponds in principle to the fourth exemplary embodiment of the cable 60''' according to the invention, but in the case of this exemplary embodiment a separating layer 82 is provided between the shielding 80 and the intermediate sheath 120 in order to give the cable the greatest possible bendability or flexibility and the information carrier unit 10 is embedded in the intermediate sheath 120.

Furthermore, the intermediate sheath 120 is not itself provided with the magnetic-field-concentrating layer 124, but the base 40 carries the magnetic-field-concentrating layer 104 on its side facing the inner cable body 62, as has been described in conjunction with the first or second exemplary embodiment.

Then, the conductor tracks 44 and the integrated circuit 42 are disposed on the base 40 in a way corresponding to the exemplary embodiments previously described.

Preferably, the entire information carrier unit 10 is substantially embedded in the intermediate sheath 120, so that the conductor tracks 44 and the integrated circuit 42 on the base 40 also protrude only partially above the surface 126 of the intermediate sheath 120, which for its part is once again covered by the outer cable sheath 90, so that the outer cable sheath 90 completely surrounds the entire intermediate sheath 120 in the manner described.

Figure 18:
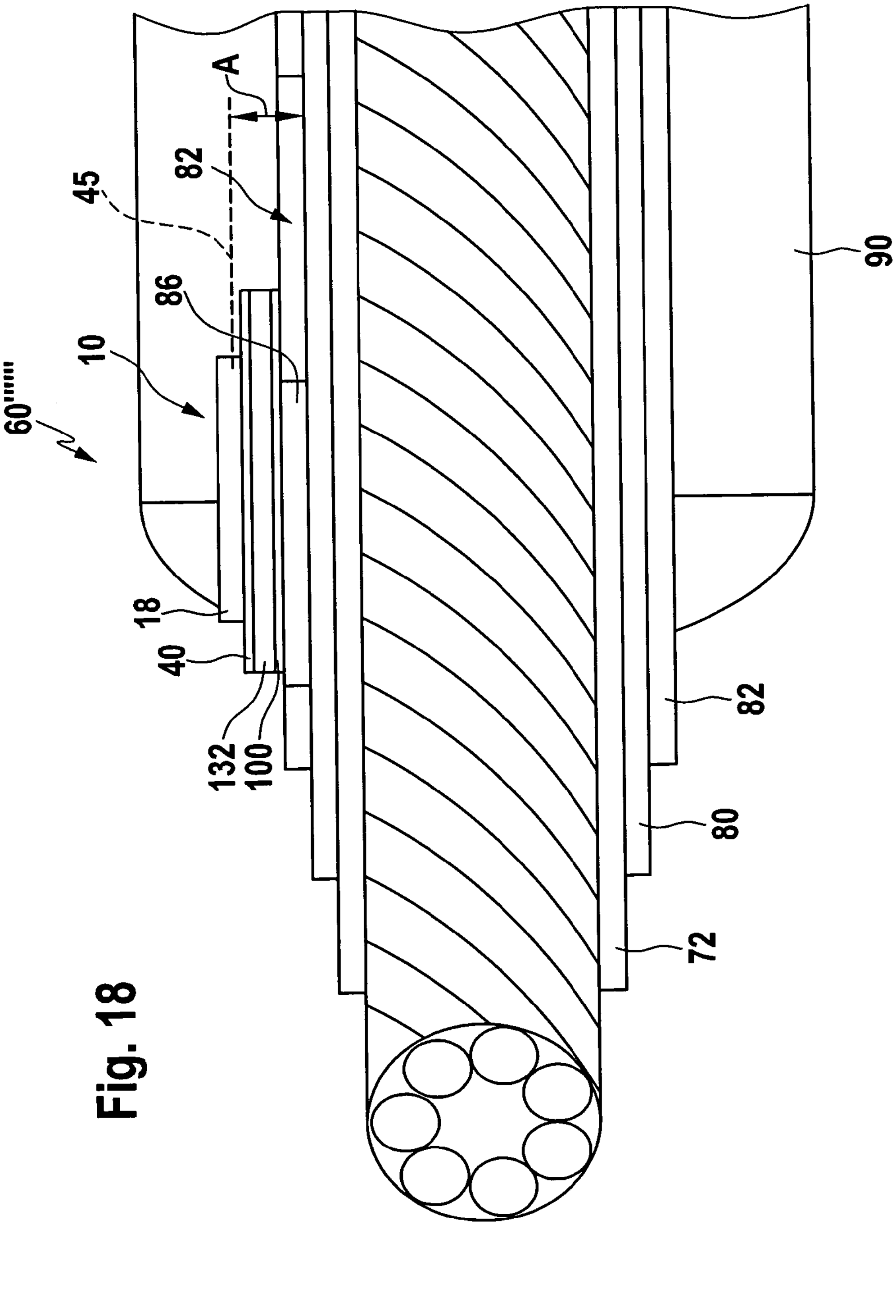
FIG. 18 shows a section similar to FIG. 9 through a seventh exemplary embodiment of a cable according to the invention and FIG. 19 shows a section similar to FIG. 9 through an eighth exemplary embodiment of a cable according to the invention.

In the case of a seventh exemplary embodiment of a cable 60'''''' according to the invention, represented in FIG. 18, the structure of the cable itself is identical in principle to that of the fourth and fifth exemplary embodiments, but with the difference that in the case of this exemplary embodiment, the antenna unit 18 is formed for the UHF range, and consequently the conductor tracks 44 merely represent a so-called dipole antenna.

In the UHF range, the disturbance of the electromagnetic field 102 coupling the antenna unit 19 of the read/write device 20 and the antenna unit 18 of the information carrier unit 10 is small if the antenna surface 45 is at a sufficiently great distance A from the shielding 80, the distance in this case being at least approximately 1.5 mm, still better at least 2 mm.

For this reason, no magnetic-field-concentrating layer is required in the case of this exemplary embodiment if, as represented in FIG. 18, the information carrier unit 10 is on a spacing element 132, which together with the second separating layer 82, the adhesive layer 100 and the base 40 forms a sufficiently thick spacing layer between the shielding and the antenna unit 18.

Figure 19:
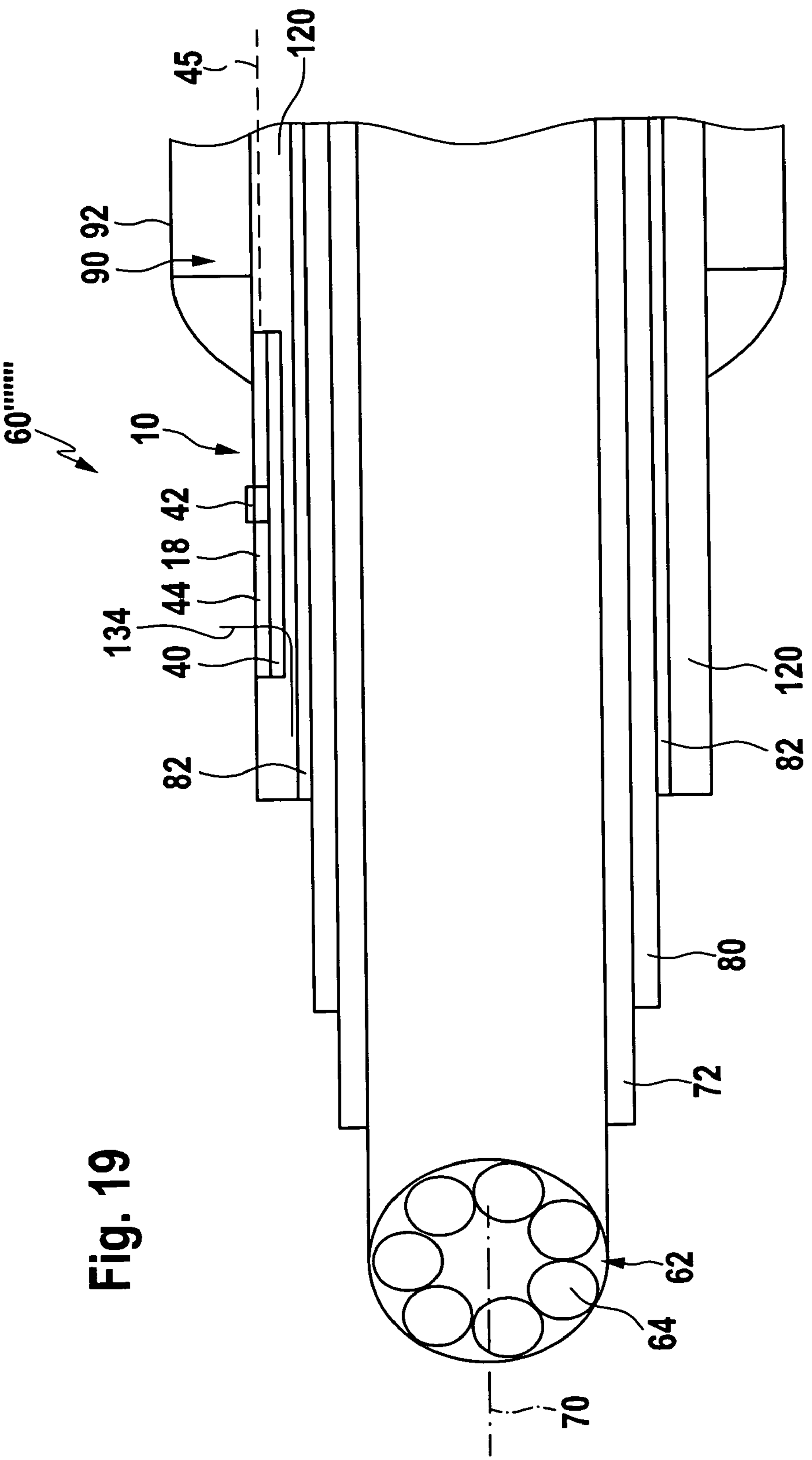

In the case of an eighth exemplary embodiment of a cable 60''''''' according to the invention, represented in FIG. 19, to achieve a sufficiently thick spacing layer for the operation of the information carrier unit 10 in the UHF range, it is provided that the information carrier unit 10 is at least partly embedded in the intermediate sheath 120, and consequently the antenna surface 45 can be disposed at a sufficient distance from the shielding 80, the material of the intermediate sheath 120 and the material of the separating layer 82 not substantially impairing the electromagnetic field 134, that is to say said materials are electromagnetically inert, so that the electromagnetic field 134 can also extend between the antenna surface 45 and the shielding 80 to the extent necessary to achieve sufficiently good coupling between the antenna unit 19 of the read/write device 20 and the antenna unit 18.

Otherwise, in the case of the second to eighth exemplary embodiments, all the parts that are identical to those of the previous exemplary embodiments are provided with the same reference numerals, so that, with regard to the description and function of these parts in each exemplary embodiment, reference is made to the previous exemplary embodiments.

The invention claimed is:

1. Cable, comprising:

an inner cable body, in which at least one conductor strand of an optical and/or electrical conductor runs in a longitudinal direction of the cable, an outer cable sheath, enclosing the inner cable body and lying between an outer sheath surface of the cable and the inner cable body, and at least one information carrier unit, disposed within the outer sheath surface of the cable, the information carrier unit having an antenna unit lying in an antenna surface that runs approximately parallel to the longitudinal direction of the cable, the antenna surface running at a distance from an electrical shielding of the cable, and an electrically non-conductive spacing layer provided between the antenna surface and the shielding, in which an electromagnetic field that couples to the antenna unit and passes through the antenna surface can extend between the antenna unit and the shielding.

2. Cable according to claim 1, wherein the spacing layer is formed at least partially such that it concentrates the electromagnetic field that couples to the antenna unit.

3. Cable according to claim 2, wherein a magnetic-field-concentrating layer is disposed in the spacing layer.

4. Cable according to claim 3, wherein the magnetic-field-concentrating layer comprises magnetically conductive particles.

5. Cable according to claim 4, wherein the magnetically conductive particles have a particle size in a range from approximately 1 μm to approximately 50 μm.

6. Cable according to claim 4, wherein the magnetically conductive particles are embedded in an embedding material.

7. Cable according to claim 6, wherein the embedding material electrically insulates the magnetically conductive particles from one another.

8. Cable according to claim 6, wherein the embedding material is a plastic material.

9. Cable according to claim 2, wherein the magnetic-field-concentrating layer faces the shielding with a side that faces away from the antenna unit.

10. Cable according to claim 2, wherein the magnetic-field-concentrating layer extends in an area of extent running approximately parallel to the antenna surface.

11. Cable according to claim 10, wherein the magnetic-field-concentrating layer has, in the area of extent, an extent which corresponds at least to an extent of the antenna unit in the antenna surface.

12. Cable according to claim 11, wherein the magnetic-field-concentrating layer has, in the area of extent, an extent which goes beyond the extent of the antenna unit in the antenna surface.

13. Cable according to claim 2, wherein an intermediate layer is disposed between the magnetic-field-concentrating layer and the antenna unit.

14. Cable according to claim 13, wherein the intermediate layer is of a magnetically inert material.

15. Cable according to claim 1, wherein the antenna unit is disposed on a base.

16. Cable according to claim 15, wherein the base is produced from a magnetically inert material.

17. Cable according to claim 15, wherein the base forms an intermediate layer between the antenna unit and the magnetic-field-concentrating layer.

18. Cable, comprising:

an inner cable body, in which at least one conductor strand of an optical and/or electrical conductor runs in a longitudinal direction of the cable, an outer cable sheath, enclosing the inner cable body and lying between an outer sheath surface of the cable and the inner cable body, and at least one information carrier unit, disposed within the outer sheath surface of the cable, the information carrier unit having an antenna unit lying in an antenna surface that runs approximately parallel to the longitudinal direction of the cable, the antenna surface running at a distance from an electrical shielding of the cable, an electrically non-conductive spacing layer provided between the antenna surface and the shielding, in which an electromagnetic field that couples to the antenna unit and passes through the antenna surface can extend between the antenna unit and the shielding, and a magnetic-field-concentrating layer, wherein the antenna unit is disposed on a carrier strand and the magnetic-field-concentrating layer is disposed on the carrier strand.

19. Cable according to claim 18, wherein the magnetic-field-concentrating layer is disposed on a side of the carrier strand that faces the antenna unit.

20. Cable according to claim 1, wherein the spacing layer is at least partly formed by an intermediate sheath lying between the shielding and the outer cable sheath.

21. Cable according to claim 20, wherein the intermediate sheath comprises a magnetic-field-concentrating layer.

22. Cable according to claim 21, wherein magnetically conductive particles are disposed on the intermediate sheath.

23. Cable according to claim 21, wherein magnetically conductive particles are embedded in a surface in the intermediate sheath.

24. Cable according to claim 1, wherein the antenna unit is disposed on an intermediate sheath lying between the shielding and an outer cable sheath.

* * * * *